United States Patent
Garcia Reyero et al.

(10) Patent No.: US 7,207,640 B2
(45) Date of Patent: Apr. 24, 2007

(54) PROGRESSIVE AND FAST PRINTMASK REVISION BASED ON INCREMENTAL CHANGES TO PRINTING ELEMENT CONDITION

(75) Inventors: Santiago Garcia Reyero, San Diego, CA (US); Joan-Manel Garcia, Sant Cugat (ES); Francesc Subirada, Castellbisbal (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 10/994,766

(22) Filed: Nov. 20, 2004

(65) Prior Publication Data

US 2006/0109294 A1 May 25, 2006

(51) Int. Cl.
*B41J 29/393* (2006.01)
*B41J 2/205* (2006.01)

(52) U.S. Cl. ............... 347/15; 347/19; 358/1.9
(58) Field of Classification Search ............ 347/15, 347/43, 19; 358/1.2, 1.9
See application file for complete search history.

(56) References Cited

U.S. PATENT DOCUMENTS

| 5,581,284 A * | 12/1996 | Hermanson ............ 347/43 |
| 6,575,549 B1 * | 6/2003 | Silverbrook ............ 347/19 |
| 2005/0174384 A1 * | 8/2005 | Koitabashi et al. ........ 347/43 |

* cited by examiner

*Primary Examiner*—Lamson Nguyen
(74) *Attorney, Agent, or Firm*—Peter I. Lippman

(57) ABSTRACT

When condition of a printing element (e.g. inkjet nozzle) changes, essentially full mask rows invoking the element are redone from scratch, best so as to fully satisfy pixel-grid neighbor conditions. This is faster than redoing a whole mask as in prior popup or precook/reheat methods, and yields better printouts than prior row-by-row mask revision (e.g. directly replacing a weak nozzle by a good one across whole rows). This method is best independent of prior mask versions, and uses no prebuilt matrix of backup/alternate entries. The number of rows redone is typically 7% to 14% below a nominal/baseline value.

23 Claims, 14 Drawing Sheets

Fig. 6

$$[C] = \begin{bmatrix} 0 & 1 & 1 \\ 1 & x & 1 \\ 1 & 1 & 0 \end{bmatrix}$$

Fig. 7

$$[M] = \begin{bmatrix} 5 & 3 & \cdots & 2 & 6 \\ 2 & \cdots & 1 & 3 & \cdots \\ \vdots & \cdots & 1 & \cdots & 2 \\ 8 & 7 & \cdots & 1 & 4 \end{bmatrix}$$

Fig. 8

$$[C] = \begin{bmatrix} \cdots & \vdots & \vdots & \vdots & \vdots & \vdots & \cdots \\ c_{-r,-s} & \cdots & c_{-r,-1} & c_{-r,0} & c_{-r,1} & \cdots & c_{-r,s} \\ \vdots & \cdots & \vdots & \vdots & \vdots & \cdots & \vdots \\ c_{-1,-s} & \cdots & c_{-1,-1} & c_{-1,0} & c_{-1,1} & \cdots & c_{-1,s} \\ c_{0,-s} & \cdots & c_{0,-1} & x & c_{0,1} & \cdots & c_{0,s} \\ c_{1,-s} & \cdots & c_{1,-1} & c_{1,0} & c_{1,1} & \cdots & c_{1,s} \\ \vdots & \cdots & \vdots & \vdots & \vdots & \cdots & \vdots \\ c_{r,-s} & \cdots & c_{r,-1} & c_{r,0} & c_{r,1} & \cdots & c_{r,s} \end{bmatrix}$$

Fig. 9

$$[C] = \begin{bmatrix} 1 & 1 & 3 \\ 2 & x & 1 \\ 0 & 1 & 0 \end{bmatrix}$$

Fig. 10

$$[M] = \begin{bmatrix} \cdots & \vdots & \vdots & \vdots & \cdots \\ \cdots & 3 & 4 & 6 & \cdots \\ \cdots & 1 & ? & 5 & \cdots \\ \cdots & 2 & 3 & 2 & \cdots \\ \cdots & \vdots & \vdots & \vdots & \cdots \end{bmatrix}$$

Fig. 11

$$[M] \cdot [C] = \begin{bmatrix} \cdots & \vdots & \vdots & \vdots & \cdots \\ \cdots & ]3-1,3+1[ & ]4-1,4+1[ & ]6-3,6+3[ & \cdots \\ \cdots & ]1-2,1+2[ & ? & ]5-1,5+1[ & \cdots \\ \cdots & ]2-0,2+0[ & ]3-1,3+1[ & ]2-0,2+0[ & \cdots \\ \cdots & \vdots & \vdots & \vdots & \cdots \end{bmatrix} = \begin{bmatrix} \cdots & \vdots & \vdots & \vdots & \cdots \\ \cdots & ]2,4[ & ]3,5[ & ]3,1[ & \cdots \\ \cdots & ]7,3[ & ? & ]4,6[ & \cdots \\ \cdots & ]2,4[ & ]2,4[ & ]2,2[ & \cdots \\ \cdots & \vdots & \vdots & \vdots & \cdots \end{bmatrix}$$

$$[C] = \begin{bmatrix} c_{-1,-1} & c_{-1,0} & c_{-1,1} \\ c_{0,-1} & x & c_{0,1} \\ c_{1,-1} & c_{1,0} & c_{1,1} \end{bmatrix}$$

Fig. 12

$$[M] = \begin{bmatrix} \ddots & \vdots & & & \\ \cdots & m_{r-1,c-2} & m_{r-1,c-1} & m_{r-1,c} & m_{r-1,c+1} & m_{r-1,c+2} & \cdots \\ \cdots & m_{r,c-2} & m_{r,c-1} & ? & & & \\ & & & & & & \end{bmatrix}$$

Fig. 13

$$m_{r,c} \in \big] m_{r-1,c-1} - c_{-1,1}, m_{r-1,c-1} + c_{-1,1} \big[ \cup \big] m_{r-1,c} - c_{-1,0}, m_{r-1,c} + c_{-1,0} \big[ \cup \big] m_{r-1,c+1} - c_{-1,-1}, m_{r-1,c+1} + c_{-1,-1} \big[ \cup \big] m_{r,c-1} - c_{0,1}, m_{r,c-1} + c_{0,1} \big[$$

Fig. 14

$$n_f = (2 \cdot c_{1,1} - 1) + (2 \cdot c_{1,0} - 1) + (2 \cdot c_{1,-1} - 1) + (2 \cdot c_{0,1} - 1)$$
$$n_f = 2 \cdot (c_{1,1} + c_{1,0} + c_{1,-1} + c_{0,1}) - 4$$

Fig. 15

$$m_{r,c} \in \left] m_{r-1,c-1} - c_{-1,-1}, m_{r-1,c-1} + c_{-1,-1} \right[ \cup \left] m_{r-1,c} - c_{-1,0}, m_{r-1,c} + c_{-1,0} \right[ \cup \left] m_{r-1,c+1} - c_{-1,1}, m_{r-1,c+1} + c_{-1,1} \right[ \cup$$
$$\left] m_{r,c-1} - c_{0,-1}, m_{r,c-1} + c_{0,-1} \right[$$

Fig. 16

$$n_b = 2 \cdot (c_{-1,-1} + c_{-1,0} + c_{-1,1} + c_{0,-1}) - 4$$

Fig. 17

$$[M] = \begin{bmatrix} \ddots & \vdots & \vdots & \vdots & \vdots & \vdots & \vdots & \ddots \\ \cdots & m_{r-1,c-2} & m_{r-1,c-1} & m_{r-1,c} & \cdots & m_{r-1,1} & m_{r-1,2} & \cdots \\ \cdots & m_{r,c-2} & m_{r,c-1} & ? & & m_{r,1} & m_{r,2} & \cdots \end{bmatrix}$$

Fig. 18

$$[C] = \begin{bmatrix} c_{1,1} & c_{1,0} & c_{1,-1} \\ c_{0,1} & \times & c_{0,-1} \\ c_{-1,1} & c_{-1,0} & c_{-1,-1} \end{bmatrix}$$

Fig. 19

Forward compatibility:

$$m_{r,c} \in ]m_{r,1} - c_{0,-1}, m_{r,1} + c_{0,-1}[;$$

Backward compatibility:

$$[M] = \begin{bmatrix} \ddots & \vdots & \vdots & \vdots & \vdots & \vdots & \vdots & \ddots \\ \cdots & m_{r-1,c-2} & m_{r-1,c-1} & m_{r-1,c} & m_{r-1,c+1} & m_{r-1,c+2} & \cdots \\ \cdots & m_{r,c-2} & m_{r,c-1} & ? & m_{r,c+1} & & \cdots \\ \cdots & m_{1,c-2} & m_{1,c-1} & m_{1,c} & m_{1,c+1} & m_{1,c+2} & \cdots \\ \ddots & \vdots & \vdots & \vdots & \vdots & \vdots & \ddots \end{bmatrix}$$

Fig. 21

Forward compatibility:

$$m_{r,c} \in ]m_{1,c-1} - c_{-1,1}, m_{1,c-1} + c_{-1,1}[ \cup ]m_{1,c} - c_{-1,0}, m_{1,c} + c_{-1,0}[ \cup ]m_{1,c+1} - c_{-1,-1}, m_{1,c+1} + c_{-1,-1}[;$$

Backward compatibility:

$$m_{r,c} \in ]m_{1,c-1} - c_{1,-1}, m_{1,c-1} + c_{1,-1}[ \cup ]m_{1,c} - c_{1,0}, m_{1,c} + c_{1,0}[ \cup ]m_{1,c+1} - c_{1,1}, m_{1,c+1} + c_{1,1}[;$$

Fig. 28

PROGRESSIVE AND FAST PRINTMASK REVISION BASED ON INCREMENTAL CHANGES TO PRINTING ELEMENT CONDITION

RELATED PATENT DOCUMENTS

Related documents are other, coowned and copending U.S. utility-patent applications filed in the United States Patent and Trademark Office—and also hereby incorporated by reference in their entirety into this document. Four related documents are in the names of Joan Manel Garcia et al. One is entitled "Fast Building of Masks for Use in Incremental Printing", utility-patent applications Ser. No. 09/150,322 and later Ser. No. 10/373,219, and issued as U.S. Pat. No. 6,826,109 on Mar. 1, 2005. Another document is entitled "Masks on Demand for Use in Incremental Printing", Ser. No. 09/150,321, issued as U.S. Pat. No. 6,965,452 on Nov. 15, 2005. The third document is entitled "Optimal-Size and Nozzle-Modulated Printmasks for Use in Incremental Printing", Ser. No. 09/150,323, issued as U.S. Pat. No. 6,788,432 on Sep. 7, 2004. The fourth is U.S. Pat. No. 6,443,556, entitled "Automated and Semiautomated Printmask Generation for Incremental Printing", issued Sep. 3, 2002.

Other related, documents incorporated by reference in this document are in the names of Shailendra Kumar et al., U.S. Pat. No. 6,283,572, "Dynamic Multi-Pass Printmode Corrections to Compensate for Malfunctioning Inkjet Nozzles", issued Sep. 4, 2001; and Ferran Vilanova et al., entitled "Streamlined Real-Time Printmask Revision, and Printing-Element Data System, to Circumvent Element Malfunction", Ser. No. 09/935,499, issued as U.S. Pat. No. 6,771,379 on Aug. 3, 2004.

Also of interest in regard to malfunctioning-nozzle identification and compensation is U.S. Pat. No. 6,010,205 of Donald Billet, with Raster Graphics. That patent, however, is not incorporated by reference.

FIELD OF THE INVENTION

This invention relates generally to machines and procedures for printing text or graphics on printing media such as paper, transparency stock, or other glossy media; and more particularly to a scanning thermal-inkjet machine and method that construct text or images from individual ink spots created on a printing medium, in a two-dimensional pixel array. The invention employs print-mode techniques to optimize image quality.

BACKGROUND OF THE INVENTION (a) Orientation—Printmasks are used to determine the pass number in which a halftone dot is formed by an inkjet on the paper. Modern inkjet printers have the capability to detect defective printing elements on-line. In order to compensate for the defective element the printmask has to be redesigned, or at least modified. (The phrase "printing element" encompasses inkjet nozzles and any of various other kinds of primal mark-forming units in the different kinds of printing systems.)

Currently applied methods either redesign a printmask on-line, or not redesign the printmask but just replace the defective printing element with a predetermined backup element. Those methods compromise the quality of the printmask, either globally (in the former), or locally.

The last stage of the inkjet printing pipeline consists of determining the pass number in which inkdrops allocated by the halftoning stage will be laid on the paper. The goal is, usually, to make sure that neighboring dots are laid as distant on the time axis, as is made possible by the number of passes allocated to the print-mode.

One reason for this time separation is that nearby liquid inkdrops might coalesce, thereby creating pigment density fluctuations on the paper. If, on the other hand, by the time a dot is laid all its previously laid neighbors are already dry, no coalescence occurs.

The pass-number allocation is technically achieved using an integer matrix of pass numbers, called printmask, which is placed in a periodically repetitive manner on the halftone pattern. This way, every halftone location corresponds to a pass number from the printmask. An inkdrop, if allocated by the halftoning stage, is laid at the corresponding pass number.

Modern inkjet printers have on-line printing-element condition- or status-checking capabilities. Having detected a defective element, a printer should relieve it from part of its duties, or simply stop using it at all. Exactly what condition of a printing element constitutes "defective" or "bad" depends generally on certain criteria, which, for example, may be defined by a design engineer or predefined in the system. A defective element—e.g. inkjet nozzle—may also be classified as "nozzle out," "weak nozzle," or "misdirected nozzle."

All this may be done by redesigning or modifying the printmask. A printmask is generally a mapping between pass numbers and dots, i.e. the mask specifies which dots will print in which passes.

Another relationship further exists, because for every line in the printmask, there is a relationship between pass numbers and nozzles. Thus, forbidding use of a certain nozzle can be achieved by prohibiting predetermined pass numbers in certain rows (lines) of the printmask. Pass numbers map in a line-dependent manner to nozzles.

The problem of compensating for damaged printing elements is thus transformed to a problem of designing new printmasks with the appropriate constraints. Since the number of elements is too large to save a different printmask optimized for the possibility that each certain element may be damaged, the design has to be performed on-line in the printer.

Printmask patterns are carefully designed to use the tradeoff between various technical and print-quality requirements, the optimization of which is complicated and may take a substantial amount of time for some uses and application, and particularly as an on-line routine. Nevertheless, fast alternatives with reasonably good quality have been used.

Three methods in use are the following.

1. Handmade masks—These allow a very good control of where each drop is placed, and also help with considering interactions between printheads in an easy way. The main drawback of handmade masks comes from the fact that they are very small, therefore tending to produce banding or regular patterns.

They also do not allow good management of printing-element usage. Any error-hiding policy that is attempted here requires some amount of hardcoded mask replacement.

2. Redesign—A new printmask is designed automatically on-line. The time and hardware constraints dictate a suboptimal design, which reduces the overall quality of the printmask. Furthermore, this method is limited to printers with enough computation power to support it, and might require a noticeable time duration to be performed.

In this method the burden of the damaged printing element is partitioned equally between the available elements. Although this method generally provides the best image quality, it is computation intensive.

3. Backup Nozzle—Every printing element has a predefined backup element. When an element is damaged, its backup is activated. The printmask does not change, only the element which will fire—related to the pass number—changes. Although this procedure requires no significant computation, it has its drawbacks.

Thus, at the lines where the damaged element was not employed, the print quality is not altered. At the damaged-element locations, however, the application of a backup element results usually in poor quality. This may be due to breaches of printmask design requirements.

In many or most cases, the two-times normal loading on the healthy (but, after all, not really new) element accelerates its aging and deterioration. Reassignment of its double-overload tasks to yet another element may also soon be required in this method, leading to triple overload of that backup unit. Thus, the double or more duty of the backup printing element might shorten its life span. Plainly the ill effects can cascade into an avalanche of printing-element failure, shortly disabling the entire printhead.

(b) Automated and semiautomated generation of printmasks—Joan Manel Garcia-Reyero, in U.S. utility-patent application Ser. Nos. 09/150,321 through '323, has introduced a basic advance in printmask generation. His system and method express all needed considerations for use in preparing a mask—and test criteria as well—in a generalized form and accordingly are able to produce at each attempt a usable mask of high quality. He devised a powerful conceptual construct within which to generate randomized masks for very large photograph-like images automatically.

In some circumstances, however, the Garcia approach in its purest form is subject to undesired limitations such as excessive time consumption for use in the field. It is accordingly susceptible to refinement for mitigation of these limitations.

Because Garcia's invention in particular addresses issues of controlling the randomness (or granularity) of printmasks and resulting images, he dubbed it "Shakes." For brevity and convenience, this document too will refer to his invention by that nickname.

Nozzle (or more generally printing-element) weighting is a technique described in Joan Manel Garcia-Reyero's document about Shakes, consisting of specifying a certain percentage of usage per nozzle. That is, a single nozzle will not only be used or not, but the number of times it will appear in a mask description can be specified.

The interesting thing is that this nozzle weighting is also dependent on the printhead status in a given moment. Algorithms to determine this weighting have also been disclosed.

It was later discovered that they could easily support Variable Paper Advance Printmodes, Pass-Dependent Nozzle Weighting and Multilevel Printing. They also provide an easy way to install printmodes into the printer, even through the Internet. Nozzle weighting also supports drop-sequence control to avoid hue shift in bidirectional printing.

(c) Classical Shakes with Nozzle Weighting—Shakes is a tool that automatically generates fuzzy masks, given a set of rules determined by the engineer who is designing the masks. Therefore, the designer must "explain" to Shakes how he or she wants the mask, and let it do it. Fuzzy masks are masks with a certain degree of randomness.

The main advantage is that masks can be generated that are far larger than handmade ones, and noisy enough to build banding robustness, but regular enough to avoid excessive granularity. Nozzle weighting is much easier now, but it still requires a significant number of CPU cycles.

The Shakes process allows Nozzle Weighting in two senses. One Nozzle-Weighting process is what is called "List." This was already implemented inside a product (Shakesmall), but there was a very poor correlation between the input weight and the actual nozzle usage.

The other Nozzle-Weighting option offered by Shakes is called "NozzDist." It requires two rounds of calculation for a given mask, the second round being much slower than the first one. This option was discarded for Shake-small because the throughput hit was unacceptable.

Another particularly beneficial property of the Shakes techniques is that they attack not only the first-generation problem of failed printing elements but also the second and third waves of failure generated by the simple-reassignment (backup) technique discussed above.

When an element is found to be malfunctioning, Shakes and its popup variant refrain from passing element-task overloads from one victim to the next, instead they recompute the overall allocation of printing burden for the entire reduced population of elements. In doing so they also take into account the type and severity of malfunction.

This total-redesign approach can work very well, redistributing the printing burden very equitably and carefully among all the working elements while observing all the best constraints for avoiding ink coalescence and other image-quality defects. It is, however, burdened by the high overhead mentioned above. A way to shorten this redesign process when further degradation of printing elements is found is thus highly desirable.

Constraints—A constraint is any design criterion that a mask is expected to satisfy. It includes spatial or so-called "pixel-grid" constraints, and pen-usage constraints such as firing-frequency constraints. Constraints can be applied within a single plane of a mask, between planes, or between different masks (for example, to make certain that yellow will not print in the same pass as cyan). There are generally two main types of constraints.

A. Neighborhood constraints—These are spatial constraints that define restrictions on the placement of dots with respect to a pivotal point (a central point in a constraint diagram as will be further discussed below), as a function of their relative position or so-called "distance," or both.

B. Pen-usage constraints—This type of constraint specifies restrictions in the way the nozzles of the pen are used.

Two types of nozzle constraint are discussed here:

Nozzle-usage acceptance defines the level of acceptability of a given nozzle. Acceptability of "zero" means forbidden, acceptability of "one" means accepted without restriction. Any number in the closed range [1,0] is allowed.

Nozzle-usage distribution defines an expected or intended distribution of the nozzles. Here a "one" still means unlimited usage and a zero means forbidden, but the values within the range are specific fractions of use, or duty cycle, desired.

As an example of the difference between these two kinds of constraint, if 0.1 is specified as the usage acceptance of a particular nozzle, that nozzle is acceptable to use but only if there is no better option. If 0.1 is specified as the usage distribution of a particular nozzle, then when printing with the fully created mask this nozzle is expected to be used exactly ten percent of the time it would have been used normally—i.e. in a conventional system.

(d) Improvements in Automated and Semiautomated Printmask Generation for Incremental Printing—Joan Manel Garcia-Reyero, in U.S. Pat. No. 6,443,556, has introduced an improvement of the Shakes system discussed above.

Precooked Masks—Prior solutions in the field using the redesign method generally involve periodically checking the health or status of the nozzles, and when the changes are significant enough, to redesign the printmask. The use of precooked masks is one way of shortening the computation time in redesigning printmasks.

Precooked masks are generated by a new version of Shakes. A precooked mask is a three-dimensional matrix. One might think of it as a stack of matrices. It is better thought of as a matrix of stacks. That is, for every single location on the paper, a full range of candidates is offered.

In general, a matrix of corresponding backup entries or of stacks of backup entries for values in the printmask is determined. Individual values in the printmask which are nonfunctional are also determined. Nonfunctional values in the printmask are exclusively replaced by corresponding backup entries from the matrix.

When the printer needs to print, the precooked mask is retrieved or generated, and then the reheating process begins. The reheating process basically consists of picking, for each print level, a candidate from the list. Although, by default, the first-level mask will pick the best candidate, the second-level mask will pick the second best candidate and so on.

In order to implement Nozzle Weighting, however, the best possible candidate is picked with a probability that is proportional to the nozzle weight. That is, if nozzle weight is six hundred (600), this nozzle will be picked in 60% of the cases. In the remaining 40% of the cases, the next candidate in the list will be evaluated for that position, and the rejected nozzle is moved to the lowest rank of the list, just in case it can help filling up higher levels of the mask.

Although time has been shortened by using precooked masks, the computational resources required to rebuild some printmasks still make it very difficult to maintain the required throughput when pens or printheads are large, e.g. five hundred twelve (512) nozzles. The time needed to regenerate a printmask is proportional to the number of nozzles in the pen and to the size (height, width, and number of passes) of the printmask.

This means that the computation for an 8,448-nozzle pen using an algorithm designed to work with a 512-nozzle pen is increased by a time factor of sixteen and a half (16.5). This could mean roughly fifty minutes to recalculate the printmask in a printer with large pens, when the goal is on the order of seconds.

With Shakes and precooked masks, a new set of masks is generated when malfunctioning nozzles are detected. This generation as explained above is generally time consuming.

A way to have masks generated and be used immediately is thus highly desirable. As suggested earlier, all the foregoing discussion is equally applicable to weighting, usage, etc. of printing elements other than nozzles.

(e) Streamlined Real-Time Printmask Revision—Other recent advances in printmask generation, particularly for multitask printers, are presented in the earlier-mentioned Kumar and Vilanova patent documents. In multitask machines, serving different markets simultaneously, ink usage is often heavy and therefore printing-element degradation is fast and erratic. Neither of these innovations is based on the Shakes systems.

The elegant procedures taught in these documents generally involve revising a plural-pass printmask when one or more malfunctioning printing elements have been identified. This procedure analyzes actual mask entries already established—that is, specific numbers in specific mask rows associated with the malfunctioning elements—and simply rearranges the existing entries.

In this way the functionality or duty of the malfunctioning printing element is displaced from one printing pass (where it would require use of a printing element known to be malfunctioning) to another pass (for which an implicated printing element is in good condition).

In general, Kumar's and Vilanova's processes modify the entry related to the pixel or dot location handled by the malfunctioning or misbehaving element—and the entry related to the dot location handled by the element which will take the place of the malfunctioning element. This means that at least two rows within the mask are modified.

Vilanova undertakes to avoid the simple-reassignment problem of overloading elements that receive reassignments from failed elements—but also in a sense undertakes a far more modest task than the total-redesign approach. His task is limited to inserting (or poking) new nozzle assignments into the overall or at least nearby load-distribution pattern, but without reworking the entire mask. This means, however, that mask constraints as originally desired by the designer may be ignored and totally breached.

Also, his system handles quickly the masking requirements for many different kinds of projects, but most generally smaller-format images and at somewhat lower range of image-quality demands—particularly a multitask printing system in which malfunction or function of each printing element is not at all stable but rather is transitory and indeed erratic. The Vilanova document also presents a methodology for storing and tracking changes in printing-element condition, in multielement printers.

(f) Conclusion—Thus failure to effectively address the difficult constraints of printmask generation by automated and semiautomated procedures has continued to impede achievement of uniformly excellent inkjet printing. Thus, important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a printmasking method for use in a printing device that has multiple printing elements. The method includes the step of monitoring condition of the elements.

Also included is a subsequent step of—substantially exclusively for pixel rows corresponding to printing elements whose monitored condition is changed—generating substantially new printmask rows that substantially fully satisfy pixel-grid neighborhood constraints. In this regard it will be understood that the word "new" does not imply that no entry from any earlier printmask can be found anywhere in a new row.

To the contrary it is quite possible that an earlier entry may appear in a new row; that is to say, the same pass number may appear in the same pixel position as before.

Since the entire row is regenerated "from scratch", however, this reappearance arises from consideration of the overall requirements on the mask, rather than by holding and repositioning earlier entries as in Kumar and Vilanova. Thus the word "substantially" appears before "new" to emphasize that a new row may possibly be similar to a corresponding row of an earlier mask.

Analogously in the foregoing discussion the word "substantially" also appears before "exclusively", to make clear that this recited method cannot be circumvented merely by generating a few new rows for printing elements whose condition has not changed—or, in the alternative, merely by leaving an occasional unmodified row that is associated with an element that has changed. In short, the wording under discussion invokes the substance of the term "exclusively", rather than a literal interpretation.

Furthermore the method of this first facet of the invention generates new rows that substantially fully satisfy neighborhood conditions. Kumar's method does satisfy some such conditions, by preferentially selecting nozzles for substitution (across a whole mask row) which are at least one pass away from the recently changed nozzle; however, because his method does not newly test the selected nozzles in each of the substitution positions, Kumar satisfies the conditions only partially.

Still another step is thereafter using the new rows in printing. This step actualizes the benefits of this first facet of the invention in terms of appearance, i.e. effectively blending the patched rows of printed dots into the portions of the pixel grid unaffected by the changed elements.

The foregoing may represent a description or definition of the first aspect or facet of the invention in its broadest or most general form. Even as couched in these broad terms, however, it can be seen that this facet of the invention importantly advances the art.

In particular, this first aspect of the invention eliminates the drawbacks of earlier mask-revision programs. Because it refrains from generating an entire new printmask, it is significantly faster than the popup and reheating methods mentioned earlier.

On the other hand, through generation of new rows—rather than merely rearranging preexisting entries in preexisting rows—it satisfies the neighborhood constraints within the pixel grid; and this the Kumar and Vilanova inventions cannot do. While their procedures are quite excellent in a mixed-application printing environment, the present invention is a very significant improvement for fine-quality printing such as promoted by the basic Shakes system.

The first major aspect of the invention thus significantly advances the art. Nevertheless to optimize enjoyment of its benefits preferably this facet of the invention is practiced in conjunction with certain additional features or characteristics.

In particular, preferably the generating step includes operating a program based on substantially satisfying pixel-grid neighborhood constraints. This program operates to automatically generate substantially the new printmask rows, unlike Kumar, substantially independently of corresponding rows in any earlier printmask, and without resort to a preestablished matrix of backup or alternate entries.

In fact another basic preference is that the method further include the step of—before the monitoring step—establishing a complete printmask that satisfies pixel-grid neighborhood constraints, considering initial condition of the elements. In this case there is also a later step, after the establishing step, of using the complete printmask in printing. Yet another step is, after the generating step, substituting the new rows for corresponding initial rows in the complete printmask.

If the basic preference just described is observed, then there are several subpreferences. One, with respect to the complete printmask, is that the neighborhood constraints be defined in terms of printing-element usage weights. Another is that the monitoring step include storing in a computer medium at least a partial historical record of incremental change between initial condition and degraded condition for each printing element. (In this regard the previously mentioned methodology presented in the Vilanova document may be particularly useful.)

Yet another subpreference is that the establishing step include establishing the complete printmask, and also the printmask with its substituted new rows, as a plural-pass printmask. Still another is that the complete printmask be generated by a Shakes program without resort to a preestablished matrix of backup or alternate entries.

Another basic preference is that the using step include printing with a number R of rows approximately equal to or less than a product $R_0$ of the number I of changed nozzles and a number p of passes in a printmode that is in use. This may be expressed equivalently in symbols as: $R \leq R_0$, where $R_0 = I \cdot p$.

If this basic preference is observed, then a subpreference is that the number R of generated rows be less than the product $R_0$ by a fraction between seven and fourteen percent. (This subpreference is particularly applicable if the number I of changed nozzles is between five and ten percent of the total number of nozzles.) The subpreference just described can be expressed equivalently in symbols as $0.07 R_0 < (R_0 - R) < 0.14 R_0$.

Another basic preference is that the new rows be a number of rows roughly equal to or less than the number of degraded nozzles multiplied by a number of passes in a printmode that is in use. Still another basic preference is that the method further include the step of storing, in a computer medium, the new printmask rows.

Yet another is that the method further include the step of defining the neighborhood constraints in terms of printing-element usage weights; the weights also reflecting the condition of each printing element respectively. Still another basic preference, as to the first main independent aspect or facet of the invention, is that the monitoring step include storing in a computer medium the condition of the elements.

In preferred embodiments of its second major independent facet or aspect, the invention is a printmasking method for use in a printing device that has multiple printing elements. The method includes the step of operating a program based on substantially fully satisfying pixel-grid neighborhood constraints, and on initial condition of the elements, to automatically establish a complete initial printmask.

A later step is using the complete printmask in printing. Another step is monitoring condition of the elements.

A further step is then operating a program based on substantially fully satisfying pixel-grid neighborhood constraints. This program automatically generates substantially entire new printmask rows—substantially exclusively for rows corresponding to printing elements whose monitored condition is changed.

In this description of the second facet, the phrase "generates substantially entire new printmask rows" refers to the procedure of generating. It is not intended to preclude the result of having generated entirely new rows that are similar to the corresponding rows in the initial mask.

The invention, in other words, does encompass situations in which the satisfaction of pixel-grid neighborhood conditions generates new rows similar to the initial rows. Also, as in the first aspect of the invention, the phrase "substantially exclusively" makes allowance for the possibility that some relatively few rows may be revised that are not associated with changed printing elements.

Yet another step is then substituting the new rows for corresponding initial rows in the complete initial printmask. Still another step is thereafter using the printmask with the substituted new rows in printing.

The foregoing may represent a description or definition of the second aspect or facet of the invention in its broadest or most general form. Even as couched in these broad terms, however, it can be seen that this facet of the invention importantly advances the art.

In particular, this second aspect of the invention explicitly includes the earlier preparation of a full printmask, and focuses upon the fact that the later revision of isolated rows follows criteria qualitatively similar to those of the initial mask generation. It is logical, then, that the patches or revised rows can have a high likelihood of blending well into the original mask.

Yet once again this facet of the invention refrains from recalculating the entire mask—unless of course so many printing elements are so seriously changed (usually degraded) that it would be either pointless or actually counterproductive to revise the mask on a row-by-row basis. In such cases ideally the method may recalculate the entire mask (with the understanding that continued printing may be of relatively low quality), or may invite the user to change the affected printhead.

Although the second major aspect of the invention thus significantly advances the art, nevertheless to optimize enjoyment of its benefits preferably the invention is practiced in conjunction with certain additional features or characteristics. In particular, preferably the generating step uses no preestablished matrix of backup or alternate entries.

Another preference is that the method further include the step of defining the initial or monitored printing-element condition, or both, by printing-element usage weights. These weights indicate the usage frequency of substantially each printing element within the printmask.

Yet another preference is that the new rows include a number of rows approximately equal to or less than the number of changed nozzles multiplied by a number of passes in a printmode that is in use. This preference is similar to that set forth above, in connection with the first aspect of the invention, as the basic preference with equivalent symbolic expressions.

Here a subpreference is that the number of new rows be on average approximately $R=[1-(1-1/N)^p]N$, where N=the total number of nozzles. (As will be understood, the subpreferences mentioned for both these cases are actually both applicable to all aspects of the invention.) Still another preference is that the new rows include a number of rows approximately equal to or less than the number of degraded nozzles multiplied by a number of passes in a printmode that is in use.

In preferred embodiments of its third major independent facet or aspect, the invention is an incremental printing device for use with at least one printmask. The printing device includes multiple printing elements.

It also includes some means for automatically generating an initial printmask. For purposes of generality and breadth in discussion of the invention, these means may be called simply the "generating means".

Also included are some means for applying the mask to print an image. Again for breadth and generality these may be called the "applying means".

In addition the printing device includes some means for revising the printmask by generating exclusively new printmask rows associated with a printing element whose condition is changed. These "revising means" are responsive to progressive condition of the respective elements.

The program operates substantially independently of initial printmask rows corresponding to the new rows. It also operates without resort to a preestablished matrix of backup or alternate entries.

The foregoing may represent a description or definition of the third aspect or facet of the invention in its broadest or most general form. Even as couched in these broad terms, however, it can be seen that this facet of the invention importantly advances the art.

In particular, because this aspect of the invention uses no preestablished matrix of entries and is essentially independent of corresponding earlier printmask rows, it avoids the problem of simply poking unusable printmask entries from one row (served by a malfunctioning print element) into another. The latter practice, as will be clear to people of common skill in this field, disrupts the carefully worked out relationships within any earlier printmask—in particular, the relationships that can prevent coalescence and excessive graininess.

Although the third major aspect of the invention thus significantly advances the art, nevertheless to optimize enjoyment of its benefits preferably the invention is practiced in conjunction with certain additional features or characteristics. In particular, preferably the revising means include means for automatically generating a number of rows approximately equal to or less than the number of changed nozzles multiplied by a number of passes in a printmode that is in use. Once again, the preferences and subpreferences expressed with symbolic equivalents, in regard to the first and second facets of the invention, are applicable here too.

Another preference is that the revising means include means for automatically generating a number of rows roughly equal to or less than the number of deteriorated nozzles multiplied by a number of passes in a printmode that is in use. Yet another is that the preestablished program is in software, firmware, or hardware, or a combination thereof. Still another preference is that the generating means are in software, firmware, hardware, or a combination thereof.

All the foregoing operational principles and advantages of the present invention will be more fully appreciated upon consideration of the following detailed description, with reference to the appended drawings, of which:

BRIEF DESCRIPTION OF THE DRAWINGS

FIG. 6 is an exemplary small constraint matrix for discussion in introducing some restriction notations used in practice of Shakes and of preferred embodiments of the invention;

FIG. 7 is a diagram representing a mask matrix;

FIG. 8 is a diagram representing a generalized constraint matrix;

FIG. 9 is another exemplary small constraint matrix;

FIG. 10 is a small exemplary portion of a mask;

FIG. 11 is an exemplary application of the FIG. 9 constraint matrix to the FIG. 10 mask;

FIG. 12 is a generalized but small constraint matrix;

FIG. 13 is a small portion of a generalized mask, to which the FIG. 12 constraint matrix has been applied;

FIG. 14 is a symbolic statement of forward-compatibility constraints for the case of FIGS. 12 and 13;

FIG. 15 is a symbolic statement of the amount of numbers forbidden by the FIG. 14 constraints;

FIG. 16 is a statement like FIG. 14, but instead for backward-compatibility constraints;

FIG. 17 is a symbolic statement of the amount of numbers forbidden by the FIG. 16 constraints;

FIG. 18 is a polar-symmetric matrix;

FIG. 19 is a mask matrix like FIG. 10, but instead for the last column of a mask that has to be tiled;

FIG. 20 is a pair of statements like FIGS. 14 and 16, but instead for the FIG. 19 final column;

FIG. 21 is a matrix like FIG. 19, but instead for the last row of the mask;

FIG. 28 is a tabulation illustrating an exemplary original (i.e. not yet revised) four-pass mask and an exemplary revised or new mask of the present invention.

DETAILED DESCRIPTION OF THE PREFERRED EMBODIMENTS

Figure 1:
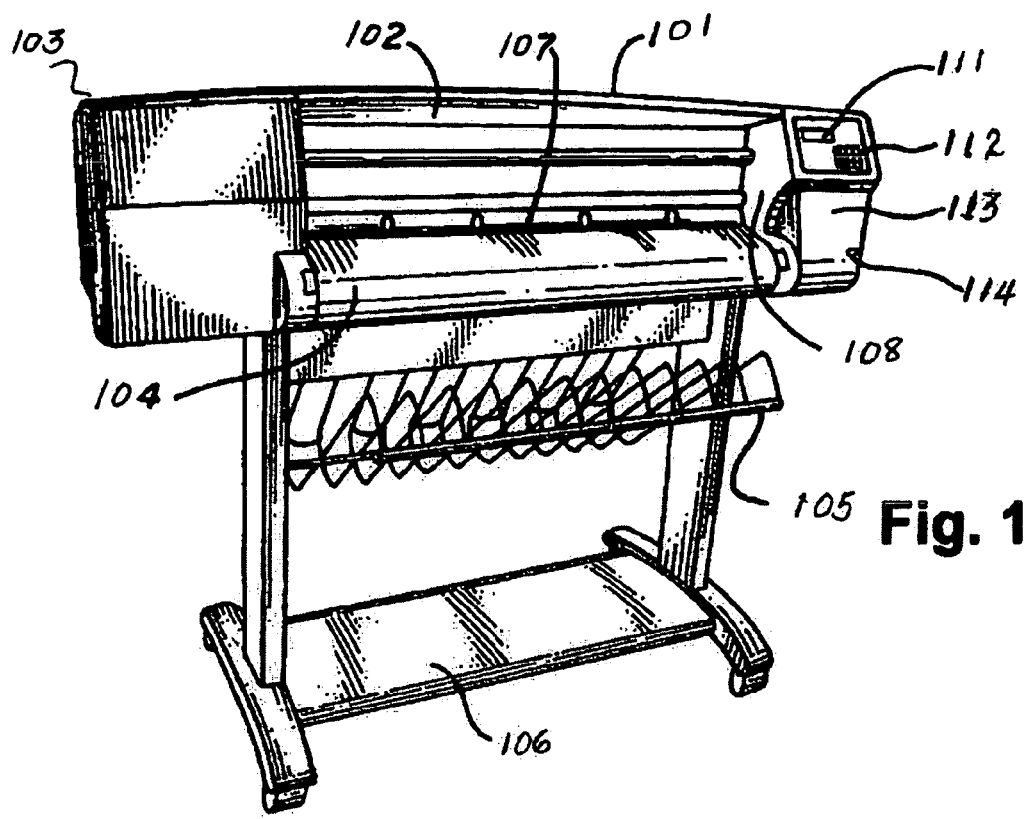
FIG. 1 is a perspective or isometric view of a printer/plotter that is and that incorporates certain preferred embodiments of the invention—though the invention is equally applicable with respect to smaller, desktop types of printers in the consumer market.

1. Hardware and Program Implementations of the Invention

Printer/Plotter—The invention is amenable to implementation in a great variety of products. It can be embodied in a printer/plotter that includes a main case 101 (FIG. 1) with a window 102, and a left-hand pod 103 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 104, and a receiving bin 105 for lengths or sheets of printing medium on which images have been formed, and which have been ejected from the machine. A bottom brace and storage shelf 106 spans the legs which support the two ends of the case 101.

Just above the print-medium cover 104 is an entry slot 107 for receipt of continuous lengths of printing medium. Also included are a lever 108 for control of the gripping of the print medium by the machine.

A front-panel display 111 and controls 112 are mounted in the skin of the right-hand pod 113. That pod encloses the right end of the carriage mechanics and of the medium advance mechanism, and also a printhead cleaning station. Near the bottom of the right-hand pod for readiest access is a standby switch 114.

Within the case 101 and pods 103, 113 a cylindrical platen 241 (FIG. 2)—driven by a motor 242, worm 243 and worm gear 244 under control of signals from a digital electronic processor—rotates to drive sheets or lengths of printing medium 204A in a medium-advance direction. Print medium 204A is thereby drawn out of the print-medium roll cover 104.

Meanwhile a pen-holding carriage assembly 220 carries pens back and forth across the printing medium, along a scanning track—perpendicular to the medium-advance direction—while the pens eject ink. The medium 204A thus receives inkdrops for formation of a desired image, and is ejected into the print-medium bin 105.

As indicated in the drawing, the image may be a test pattern of numerous color patches or swatches 256, for reading by an optical sensor to generate calibration data. For present purposes, such test patterns are for use in monitoring for and detecting printing elements (e.g. nozzles) that are performing poorly or not at all.

A small automatic optoelectronic sensor 251 rides with the pens on the carriage and is directed downward to obtain data about pen condition (nozzle firing volume and direction, and interpen alignment). The sensor 251 can readily perform optical measurements; suitable algorithmic control is well within the skill of the art.

A very finely graduated encoder strip 236 is extended taut along the scanning path of the carriage assembly 220 and read by another, very small automatic optoelectronic sensor 237 to provide position and speed information for the microprocessor. One advantageous location for the encoder strip 236 is immediately behind the pens.

A currently preferred position for the encoder strip 333 (FIG. 3), however, is near the rear of the pen-carriage tray—remote from the space into which a user's hands are inserted for servicing of the pen refill cartridges. For either position, the sensor 237 is disposed with its optical beam passing through orifices or transparent portions of a scale formed in the strip.

Figure 4:
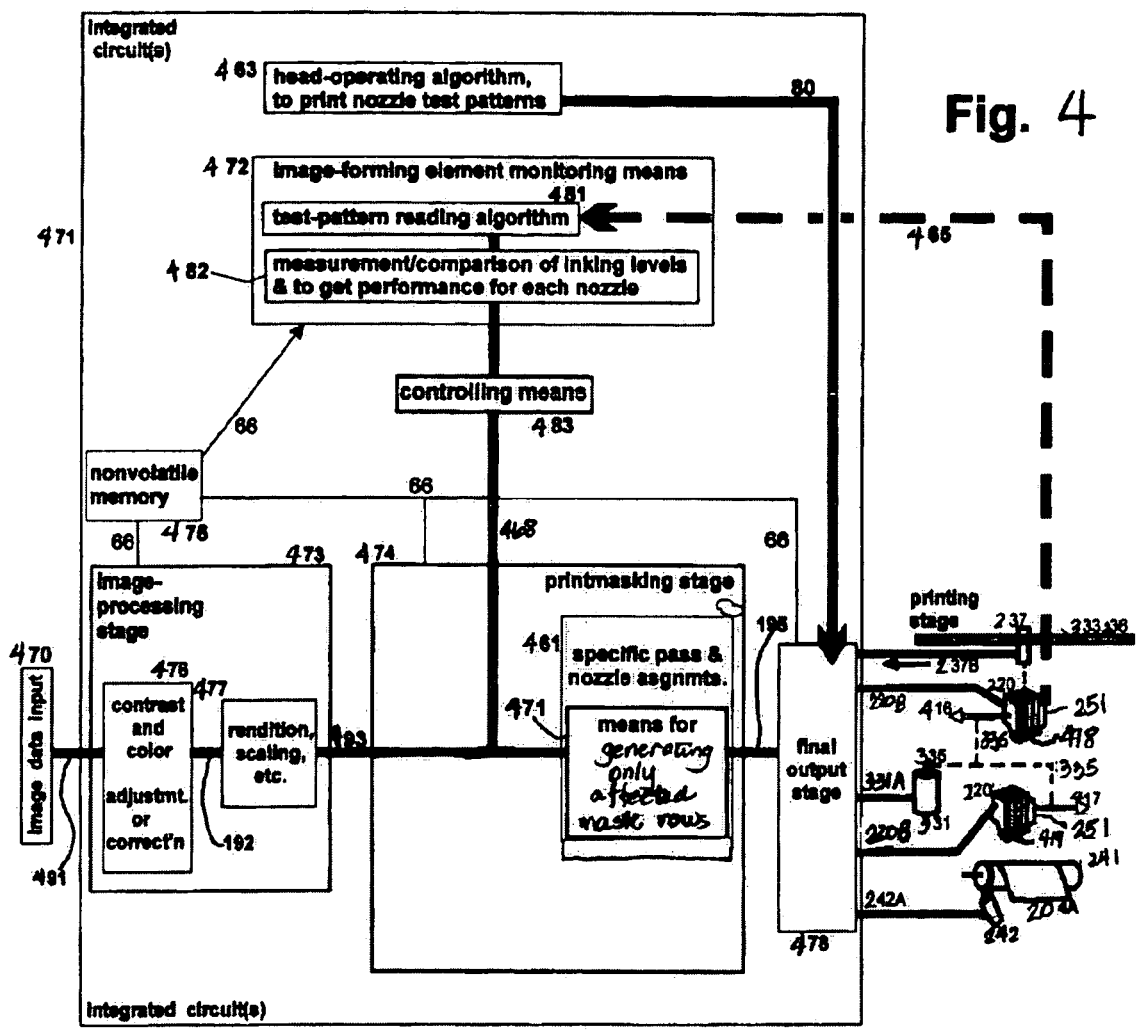
FIG. 4 is a schematic block diagram, focusing upon the functional blocks within the program-performing circuits of the preferred embodiment.

The pen-carriage assembly 220 is driven in reciprocation by a motor 331—along dual support and guide rails 332, 334—through the intermediary of a drive belt 335. The motor 331 is under the control of signals from the digital processor 471 (FIG. 4).

Naturally the pen-carriage assembly includes a forward bay structure 322 (FIG. 3) for pens—preferably at least four pens 323–326 holding ink of four different colors respectively. Most typically the inks are yellow in the leftmost pen 323, then cyan 324, magenta 325 and black 326.

Another increasingly common system, however, has inks of different colors that are actually different dilutions for one or more common chromatic colors, in the several pens. Thus different dilutions of black may be in the several pens 323–326. As a practical matter, both plural-chromatic-color and plural-black pens may be in a single printer, either in a common carriage or plural carriages.

Also included in the pen-carriage assembly 220 is a rear tray 321 carrying various electronics. The colorimeter carriage too has a rear tray or extension, with a step 334 to clear the drive cables 335.

Figure 2:
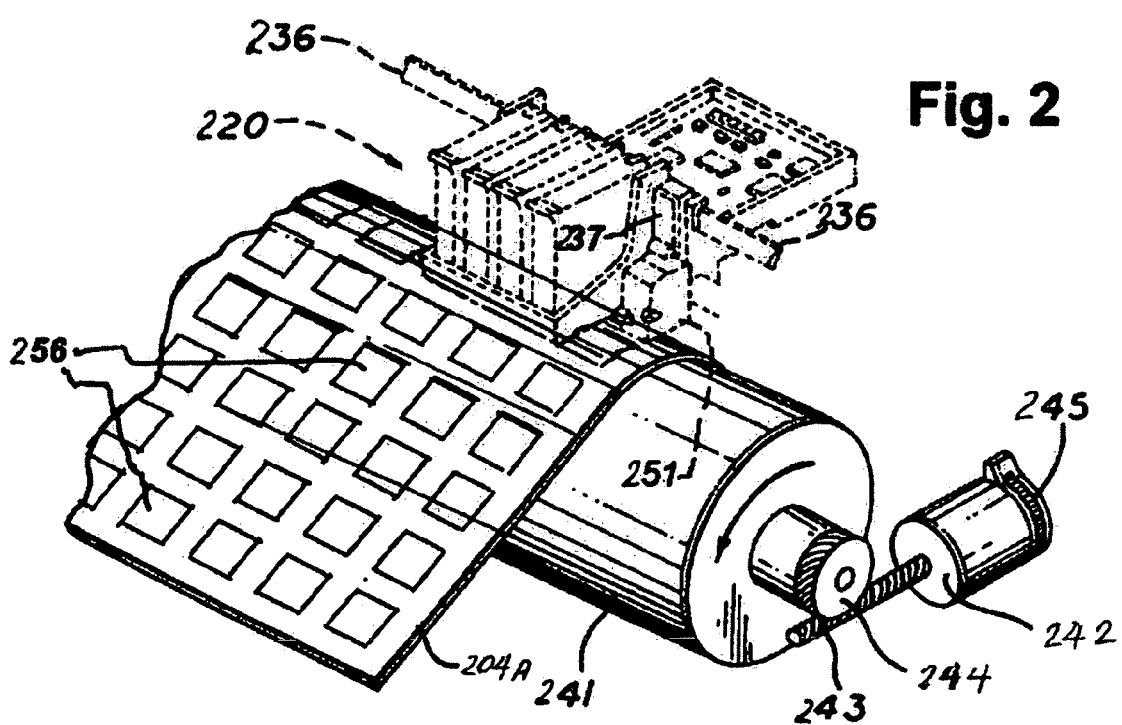
FIG. 2 is a like view, but enlarged, of portions of a printing engine—particularly including a printing medium advance mechanism—within the FIG. 1 printer plotter.
Figure 3:
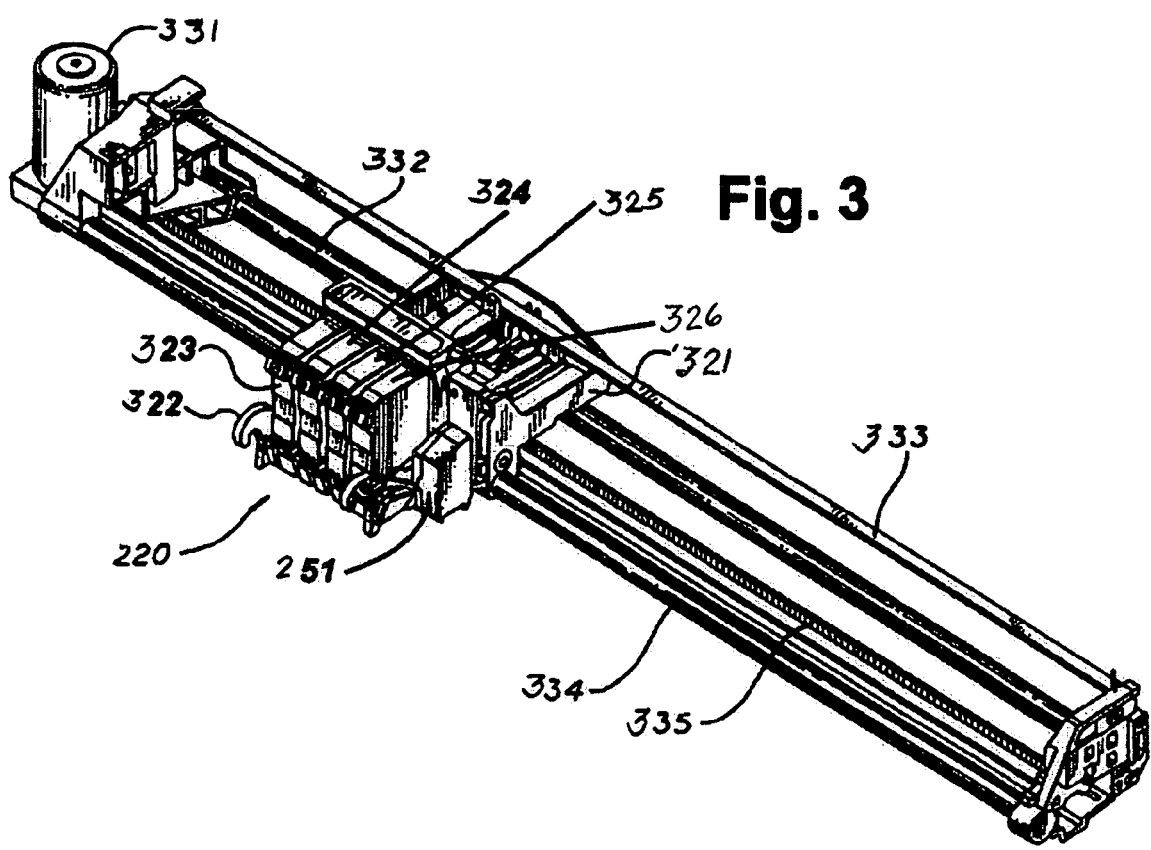
FIG. 3 is a like view, but somewhat less enlarged, of a bigger portion of the print engine.

FIGS. 1 through 3 most specifically represent a system such as the Hewlett Packard printer/plotter model "Designjet 2000CP", which does not include the present invention. These drawings, however, also illustrate certain embodiments of the invention, and—with certain detailed differences mentioned below—a printer/plotter that includes preferred embodiments of the invention. This exemplary printer also shows a printer/plotter model which may incorporate Shakes, as well as the present invention.

Before discussion of details in the block diagrammatic showing of FIG. 4, a general orientation to that drawing will be offered. In FIG. 4, most portions 470, 473, 475–478 across the center, including the printing stage 204A–251, 331–335, 416–419 at far right, are generally conventional and represent the context of the invention in an inkjet printer/plotter such as that of FIGS. 1 through 3.

The remaining central portions and the upper portions of FIG. 4 relate to the present invention particularly. These portions are discussed below.

Now turning to details, the pen-carriage assembly is represented separately at 220 (FIG. 4) when traveling to the left 416 while discharging ink 418, and at 220' when traveling to the right 417 while discharging ink 419. It will be understood that both 220 and 220' represent the same pen carriage.

The digital processor 471 provides control signals 220B to fire the pens with correct timing, coordinated with platen drive control signals 242A to the platen motor 242, and carriage drive control signals 331A to the carriage drive motor 331. The processor 471 develops these carriage drive signals 331A based partly upon information about the carriage speed and position derived from the encoder signals 237B provided by the encoder 237.

(In the block diagram all illustrated signals are flowing from left to right except the information 237B fed back from the sensor—as indicated by the associated leftward arrow.) The codestrip 333 thus enables formation of color inkdrops at ultrahigh precision during scanning of the carriage assembly 220 in each direction—i.e. either left to right (forward 220') or right to left (back 220).

New image data 470 are received 491 into an image-processing stage 473, which may conventionally include a contrast and color adjustment or correction module 476 and a rendition, scaling etc. module 477. Information 493 passing from the image-processing modules next enters a printmasking module 474, typically including a stage 461 for specific pass and nozzle assignments. The latter stage 461 performs generally conventional functions, but in accordance with certain aspects of the present invention also particularly includes means 471 for generating only affected mask row or rows.

Information for driving the printmasking stage is derived by a module 463 that controls the final output stage 478 to print nozzle test patterns for reading by the sensor 251, FIG. 4 (or if preferred to eject inkdrops selectively into an optical detector, not shown, that senses the drops directly, e.g. while in flight). The resulting sensor signal 465 is monitored in a monitoring module 472.

That module operates according to a program 481 for reading the sensor signal, and another program stage 482 that measures the signals, and compares some signals with others, to determine inking levels and thereby determine the performance for each band of the printheads. The results of these measurements are massaged in a control stage 483, deriving an operating signal 468 for the printmasking stage.

The means represented by the several operational blocks 463, 472, 483, 461, 473, 474, 478, and also the swath-characteristic-varying functions 471, 476, 481 as shown—are implemented within integrated circuits 71. Given the statements of function and the swath diagrams presented in this document, an experienced programmer of ordinary skill in this field can prepare suitable programs for operation of the circuits.

As is well known, the integrated circuits 471 may be part of the printer itself, as for example an application-specific integrated circuit (ASIC), or may be program data in a read-only memory (ROM)—or during operation may be parts of a programmed configuration of operating modules in the central processing unit (CPU) of a general-purpose computer that reads instructions from a hard drive.

Most commonly the circuits are shared among two or more of such kinds of devices. Most modernly, yet another alternative is a separate stand-alone product, such as for example a so-called "raster image processor" (RIP), used to avoid overcommitting either the computer or printer.

Figure 5:
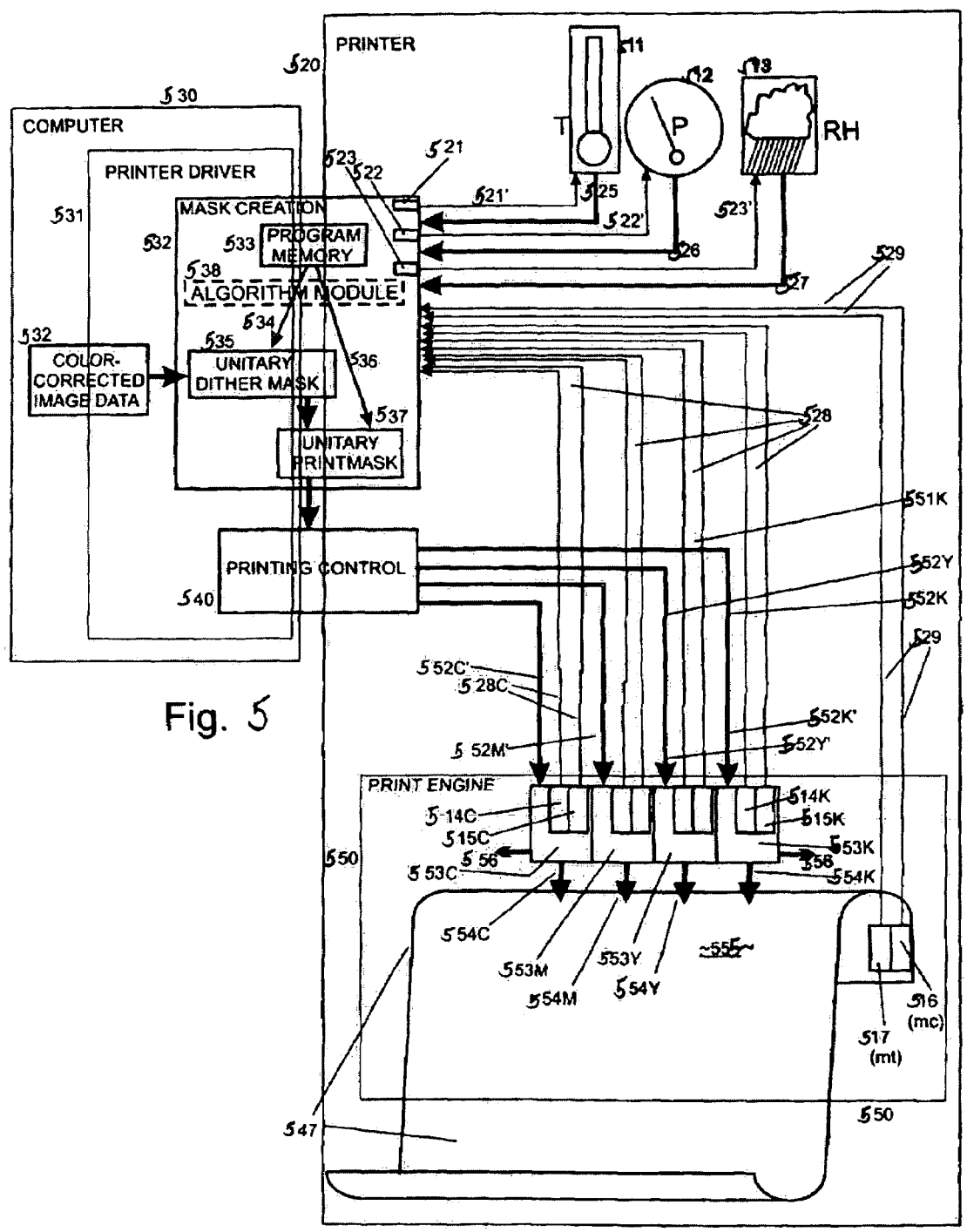
FIG. 5 is a block-diagrammatic representation of another hardware system according to the invention, but including a computer.

Another embodiment of the invention may also operate in a printer 520 (FIG. 5) that includes a print engine 550 and is coupled to a computer 530 (usually a personal computer or workstation) that includes a printer driver 531. Data 532 typically reside in the computer, typically in some graphics application program, but often is partially developed or refined in the driver 531—as is symbolized by the position of the data block 532 partially inside the driver 531.

The hardware of the present invention may most typically be a microprocessor and memory residing in the printer 520, operating in conjunction with the printer driver 531; however, in many cases the mask-creation, including row-creation, capability 532 and its target printing-control block 540 are distributed partially in the driver 531 and partially in the printer 520—again as represented in the drawing by the positions of the blocks 532, 540 spanning the driver and printer blocks 531, 520.

One core part of Shakes is the mask-creation block 532, which includes a program memory that controls generation 534, 536 of a unitary dither mask 35 or a unitary printmask 537, or both. This mask-creation block 532, contains the present invention—which includes creating specific rows related to nozzles whose incremental status has changed—and the capability of keeping track and determining incremental status changes. An effort has been made to symbolize the data-compression characteristic of the invention here by drawing the program-memory block smaller than each of the mask blocks 535, 537.

The program, however, actually controls generation of masks through the algorithm module 538, which resides in a part of the program memory 533. Much of the remainder of that memory is occupied by the NSP file discussed earlier.

To enable the previously introduced adaptive features of the invention, the mask-creation block 532 receives inputs 528 of information 528 that has been encoded into or generated within devices 514, 515 in the several pens 553C, 553M, 553Y, 553K (cyan, magenta, yellow and black respectively). The information encoding or generating devices report on pen dropweight, nozzle behavior, pen age and the like.

The mask-creation block 532 also receives inputs 529 of information about the present printing medium 547. This information once again may be found from encoding or sensors at the medium. Such information sources relate to medium color 516 or type 517, or both.

Further, devices 521–523 in the mask-creation block send queries 521'–523' to environmental sensors 511–513, to determine temperature T, pressure P or humidity RH, or combinations of these as desired. The sensors respond with the corresponding informational signals 525–527.

When the image data 532 is processed through the dither mask 535 and printmask 537, output signals proceed to the printing-control block which issues commands 552C'–552K' to the respective pens for ejection of ink 554C–554K to form an image 555 on the printing medium 547. The system downstream of the printing control block 540 may be substantially conventional, or may be in part or wholly made up of new writing systems not now known.

2. Shakes

As a base for understanding the present invention, some features of Shakes are further discussed below. Although Shakes is a powerful tool, a way to shorten the time for generating masks is highly desirable in this art.

A. Basic Approach

This section introduces with an example the Shakes method for building large masks.

The Mask—The mask is just an array of numbers, each one over a pixel, that in a printmask represent the pass in which that pixel will be printed and in a dither mask represent a discriminator against which input levels are to be tested. For example, this eight-pass printmask:

| 5 | 6 | 4 | 7 | 1 |
|---|---|---|---|---|
| 7 | 1 | 3 | 2 | 4 |
| 5 | 8 | 7 | 6 | 3 |
| 7 | 4 | 1 | 8 | 2 |
| 8 | 3 | 2 | 5 | 4 | means that the first dot of the first row will be fired in pass five, while the second dot of the first row will not be fired until pass six, and so on. Thus the mask is always something that is directly related to the dots on the drawing: each dot (each position in the mask) will have a pass number in which to be fired.

The Restrictions—These are expressed in the form of a matrix, called the constraint matrix. This matrix will have a center point (i.e. the number of rows and the number of columns are odd numbers), which will be called the pivotal point.

The meaning of the constraint matrix is the following. When the center point of the matrix is placed over any position on the mask, this position cannot be fired in the same pass as those neighbors in the mask that are beneath a one ("1") of the constraint matrix.

Consider as an example the constraint matrix that is shown as FIG. 6. An alternative graphical way of saying the same is—

where the grey squares represent the neighbors that will be taken into consideration, the white square is the pivotal point, and the black squares are the neighbors that will not be taken into consideration.

Next consider the following mask (the same as before, with eight passes, but now without the center value)—

| 5 | 6 | 4 | 7 | 1 |
|---|---|---|---|---|
| 7 | 1 | 3 | 2 | 4 |
| 5 | 8 | ? | 6 | 3 |
| 7 | 4 | 1 | 8 | 2 |
| 8 | 3 | 2 | 5 | 4 | and we want to find a legal option for the center pixel, the one containing a question mark. We would put the constraint matrix with the pivotal point over the position in question, thus getting something like the following.

| 5 | 6 | 4 | 7 | 1 |
|---|---|---|---|---|
| 7 |   |   |   | 4 |
| 5 |   | ? |   | 3 |
| 7 | 4 |   |   | 2 |
| 8 | 3 | 2 | 5 | 4 |

The grayed numbers are the forbidden values. This means that three, two, eight, six, four and one are not legal pass numbers for the center point. The only options are five and seven. It is preferable to choose seven, as five is in the same row just two positions before.

Building the mask—Next will be shown a method for building the halftoning mask or the printmask. This will be done by rows: beginning with the first pixel in the first row, doing all the first row, and so on. If the process has been followed down to the second pixel of the third row, the mask is like—

| 5 | 6 | 4 | 7 | 1 |
|---|---|---|---|---|
| 7 | 1 | 3 | 2 | 4 |
| 5 | 8 |   |   |   | and the next value is now to be chosen (in a printmask it is the pass in which the center point will be printed). The first step is to look at the restrictions imposed for the new point. This means superimposing the constraint matrix, in this way:

| 5 | 6 | 4 | 7 | 1 |
|---|---|---|---|---|
| 7 |   | 3 | 2 | 4 |
| 5 | 8 |   |   |   |
|   |   |   |   |   |
|   |   |   |   |   |

The forbidden values for the new point are seen to be three, two and eight.

There are, however, more restrictions. What has just been done is to make sure that the new point will be legal, but there are other points already assigned that must continue being legal! This means that it is necessary now to put the constraint matrix over the neighbor points already assigned, and see what restrictions are imposed by doing so.

Positioning the mask over the one shows that it imposes no restrictions on the central pixel:

|   | 6 | 4 | 7 | 1 |
|---|---|---|---|---|
| 7 | 1 | 3 | 2 | 4 |
| 5 | 8 |   |   |   |
|   |   |   |   |   |
|   |   |   |   |   |

Placing the mask over the three yields:

| 5 |   | 4 | 7 | 1 |
|---|---|---|---|---|
| 7 | 1 | 3 | 2 | 4 |
| 5 | 8 |   |   |   |
|   |   |   |   |   |
|   |   |   |   |   | which requires that the candidate for the new position cannot be a three.

If in like fashion the constraint matrix is positioned over all the neighbors of the central candidate, the values forbidden by the fact that the values already there have to continue to be legal would be seen to be three, two and eight. These are precisely the same conditions previously found for the new value to be legal.

The constraint matrix has a certain "symmetry." If the lower right corner were instead a one (shadow) instead of a zero (black), then placing the constraint matrix over the one (see two masks above), would reveal that the one had become a forbidden option. That would mean that the conditions needed to continue to assure the legality of numbers already there would not be the same as the conditions needed to assure the legality of the new option.

This implies—if constraint matrices follow this kind of special symmetry, it is necessary to look at only one set of the conditions to be sure that all the conditions will be satisfied. In other words, the mask can just be constructed in a continuing forward progression without ever looking back and changing the numbers that were put in before.

The entire printmode mask is generally created in this manner. A few more complications arise, however, when the mask is tiled.

B. Definitions

A mask will be defined assigning to each pixel a number representing (in a printmask) the pass in which it will be printed. It will be represented by a matrix called [M]. For example, in the mask of FIG. 7 the number two in the second row means: "this pixel will be printed during a printhead's second pass." Its elements will be referred to as $m_{f,c}$, where f, c have the usual meaning of row, column respectively (both starting at 1).

The restrictions will be defined by a $(2r+1) \times (2s+1)$ constraint matrix. This matrix will be called [C], and its components $c_{i,j}$, where i, j will not have the usual meaning: they will refer to the distance in rows and columns to the center point as exemplified in FIG. 8. The center point ("X") is called the pivotal point.

Components of both the mask and the constraint matrix will be a set P of the natural numbers having these useful properties:

a) They have an upper bound, which will be the number of passes, and a lower bound which will be 1. For example, if the number of passes is 4, possible values are 1, 2, 3, 4.

b) They have an internal sum defined in such a way that they "wrap around" at the maximum value. This means that, with the previous set, 3+1=4; but 3+2=5, so it wraps around to be 1.

c) They have a way to define intervals that is consistent with the above definition: the interval [a,b] is the set of numbers that results if, beginning with a, each number is the preceding plus one, until b is reached. In the example above, the interval [2,4] is the set {2,3,4}, and the interval [4,2] are the numbers {4,1,2}.

The closed interval [a,b] includes the boundary values; the open interval ]a,b[ does not.

The meaning of the constraint matrix is: given any particular position in the mask, if the constraint matrix is superimposed over the mask such that the pivotal point is over that particular position, the value in this point of the mask cannot be in the open range defined by the numbers of the constraint matrix on the numbers of the mask that are below them. The following example will show that the actual application is quite simple.

The constraint matrix is in FIG. 9, and the number of passes is eight. The objective is to assign a value of a point on the mask that appears at "?" in FIG. 10. The constraint matrix should be positioned with the pivotal point over that position "?" to be assigned, and the forbidden ranges calculated as suggested in FIG. 11. This means that the forbidden numbers for the new position are, beginning with the first row:

{3}, {4}, {4,5,6,7,8}
{8,1,2}, , {5}
{ }, {3}, { }

It is clear that all the possible numbers are in the forbidden set, so it is not possible to find any number for the new position that satisfies all the conditions.

An interesting subset of the constraint matrices is those matrices which contain only zeroes and ones. The candidate has to be different from the preexisting numbers where the constraint is 1, and there are no restrictions on the candidate where the constraint is 0.

C. Building the Internal Part of the Mask

Given a matrix of constraints, there are a number of ways to construct a mask that fulfills them. The best way to build the mask is probably by filling it by rows or by columns.

Say we want to construct a mask by rows. We can definitely assign the first number. Let's assume that we have been able to assign values to the mask up to the f,c−1 position, and let's see what restrictions exist for the f,c position. Rather than a demonstration of this for a general constraint matrix, the derivations will be shown here with a small, 3×3 matrix to more simply illustrate the principles and procedure.

The constraint matrix will be as shown in FIG. 12, and the state of the mask when the next step is to find $m_{f,c}$ is shown in FIG. 13. Notice that, because the construction process is proceeding row by row, after the question mark that is the point of present interest there is currently nothing.

Given a three-by-three constraint matrix with the usual notation, the restrictions can be segregated into two main groups: restrictions needed to ensure that the numbers already there will continue to be "legal", and restrictions coming from the fact that the new number itself will have to be legal.

Forward compatibility—For the numbers already there to continue being legal, we have to apply the constraint matrix to them and see what restrictions are imposed on the candidate. The result appears in FIG. 14.

In general, each one of the restrictions defines a set of $2c_{i,j}-1$ numbers. (For example, if we apply $c_{i,j}=3$ to 5, we find the interval ]2,8[, which does not include its borders, so the set of numbers is {3,4,5,6,7}). The amount of forbidden numbers to assure forward compatibility appears as FIG. 15.

Backward compatibility—But there are more restrictions: the ones that the new candidate has to satisfy to be legal itself. We can find them by applying the constraint matrix to the position of the candidate, leading to the conditions in FIG. 16. Those are the conditions that assure backward compatibility. In general, they will be different from the preceding ones, defining $n_b$ forbidden numbers seen in FIG. 17.

Now, from examination of all the conditions, it is clear that some restrictions can be imposed upon the constraint matrix that will make the backward compatibility conditions equal to the forward compatibility conditions. Specifically, if we require—

$c_{-1,-1}=c_{1,1}$; $c_{-1,0}=c_{1,0}$; $c_{-1,-1}=c_{1,1}$; $c_{-1,1}=c_{1,-1}$; $c_{0,-1}=c_{0,1}$ then the backward compatibility conditions are the same as the forward compatibility conditions. This means that, with a constraint matrix such as appears in FIG. 18, just imposing backward compatibility will ensure forward compatibility. This kind of matrix will be called "polar symmetric."

D. Building the Last Column

If the mask has to be tiled, the points on the last row and the last column are more constrained—because when it is time to put them in, it develops that their neighbors are the first column and the first row, which have already been assigned. Accordingly, trying to assign a point in the last column of a mask that has to be tiled is equivalent to having a mask such as shown in FIG. 19.

Notice that the subindices c+1 and c+2 have been replaced by 1 and 2, respectively. This produces exactly the same set of conditions as already seen above (but replacing $m_{f-1,c+1}$ by $m_{f-1,1}$), plus two new ones coming from the wraparound: forward and backward compatibility as presented in FIG. 20.

E. Building the Last Row

Trying to assign a point in the last row is equivalent to having a mask as shown in FIG. 21. The added conditions are for forward and backward compatibility appear in FIG. 22.

Assuming the matrix is polar symmetric, here we add $(2 \cdot c_{1,-1}-1)+(2 \cdot c_{1,0}-1)+(2 \cdot c_{1,1}-1)$ new constraints. The most restrictive situation is that of trying to find the very last point. Then the process is at both the last row and the last column, and all the possible restrictions apply.

F. Defining the Constraint Matrix to Best Advantage

Figures 22, 23:
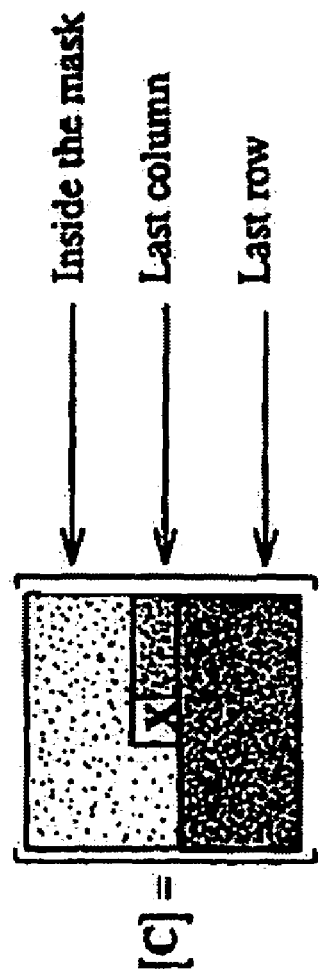
FIG. 22 is a pair of statements like FIG. 20, but instead for the FIG. 21 last row.
FIG. 23 is a diagrammatic model of a usage of the constraint space for polar-symmetric matrices only.

If it is decided to work with polar-symmetric matrices only, then only half of the matrix is actually needed since the other half carries redundant information. If the construction is performed by rows, it is possible to actually have three matrices in one:

The first half defines the construction inside the mask, the second half of the middle row (excepting the pivotal position) constrains the construction in the last column, and the second half of rows (excluding the center row) constrains the construction of the last row. This is shown in FIG. 23. Defining the constraint matrix in this way allows loosening the restrictions for the last row or column without changing the construction of the inside of the mask.

G. Filling in the Values

The discussion to this point has centered on the constraints—but when ready to fill in a certain position, and after having discarded the forbidden values, there are many ways to actually choose the value for that position, from the range of possibilities. Options that are available include:

a) just randomly picking one;

b) assigning to the possible candidates a distribution of probability, that makes it more likely to pick up the ones that are "farther away" from the forbidden values; and c) picking the candidate that is "farthest away" from the forbidden values.

This list is not intended to be exhaustive. The distribution of probability for option "b)" can be linear, or exponentially decaying, or arbitrary, or may follow any number of other functions.

H. Accommodation of Other Algorithms

The present implementation of Shakes includes a program written in "C++." Shakes uses an input text file—called an "NSP file" (Neutral Specification Protocol)—of mask constraints, and also uses a printmask-generating control algorithm. The control algorithm uses the information in the NSP file to guide generation of a mask.

Thus Shakes is in a sense an interpreter of a language called "NSP" that is used to represent what a writing-systems designer expects from the mask that is going to be built. All the constraint syntax presented in this document is NSP syntax. The program automatically reads the NSP file to accept the constraints defined by the designer, and it automatically accepts a definition of a printmask-generating control algorithm.

It may fairly be said that portions of the program other than the control algorithm "know how to read the input file" and also "know how to generate a mask." The program, as distinguished from the control algorithm, automatically generates a mask, under control of the control algorithm.

The program can also be made to generate printmasks or dither masks, selectively—depending merely on the contents of NSP files that are invoked, and operation of a small number of corresponding software switches to control what the system does with the output masks.

I. Weighters

This discussion relates to strategies that allow a computer program to build a printmask that fulfills certain requirements, and the concepts underlying them. It is assumed that the designer knows what requirements the mask is supposed to fulfill.

Weighters—In comparison with making masks that fulfill "hard" restrictions (such as "two horizontal neighbors cannot be fired in the same pass"), a softer and more general way to express the desired characteristics of masks is the weighter. Loosely speaking, a weighter is any criterion that can be applied to a mask to rate how favorable a given candidate pass number is for a given pixel position.

The associated concept of a weight, as previously indicated, is a number ranging from 0 to 1 that measures how good would a candidate be in a certain position of the mask.

This number is meaningful primarily when compared with the weights for other candidates; it is a relative score.

Moreover, the favorability expressed by a weighter is neither precise nor fully objective. The weight is just a means for measuring a preference from the designer, defined by a certain criterion or combination of criteria.

Thus the weighter is a formalization of a criterion that assigns weights, relative preferences, to all the candidates for a given position. There are different parameters that the criteria can be based upon: the character of existing neighbors of the subject position, the localization of that position with respect to the beginning of the drawing, the nozzle that would have to print the pixel for each candidate—and even the values in relative positions of another mask.

A weighter assigns weights to all the candidate pass numbers. For example, in an eight-pass print mode, a weighter should be able to assign weights to the numbers one through eight for any given position in the mask.

Combining weights—In many cases more than one weight is assigned to a given candidate, either because more than one weighter is applicable or because one weighter is assigning more than one weight. In these cases, Shakes preferably uses an algorithm for combining the different weights into one number, because the final decision on the candidate relies on having just one weight for each candidate.

Shakes generally combines weights by averaging them, with the exception of the weight "zero": if a zero is present in the list of weights for a given candidate, the combined weight is zero no matter what the other weights may be. If there is no zero, the combined weight is the average of weights.

Building a flat mask; quality of the mask—Flat masks are those in which just one drop is to be printed for each pixel. This is the case of the mask for one color in a noncomposite printer.

Here is a way to build such a mask: begin at the upper left corner of the mask, and fill in row by row. For each position, let all the weighters assign a weight to each candidate.

Each weighter will be multiplying the weights it is supposed to assign by a relative weight, also defined by the user, that represents the relative importance of a weighter with respect the other weighters acting. When all the weights have been assigned to each candidate, they are combined into one weight per candidate.

After that, the choice can be made, for which a couple of options are implemented. One is picking the candidate with highest weight (if more than one has highest weight, randomly pick one among them). The other option is using the weights as probabilities and picking one in such a way that the probability of being chosen is the weight.

Once a candidate has been chosen, its weight is a good measure of how good the option is. Therefore, averaging the weights of all the candidates chosen while building a mask is a measure of how good the whole mask is.

In other words, given a certain set of weighters, the best mask is the one that, when applying the weighters to all its values, will give a highest average. This average will be called quality of the mask, and it is meaningful only referred to a certain set of weighters. Being able to calculate a quality for the mask is very important for the Shakes feature of optimizing the mask generation.

3. Applying the Present Invention

A. Novel Application of "Conventional" Shakes

Figure 24:
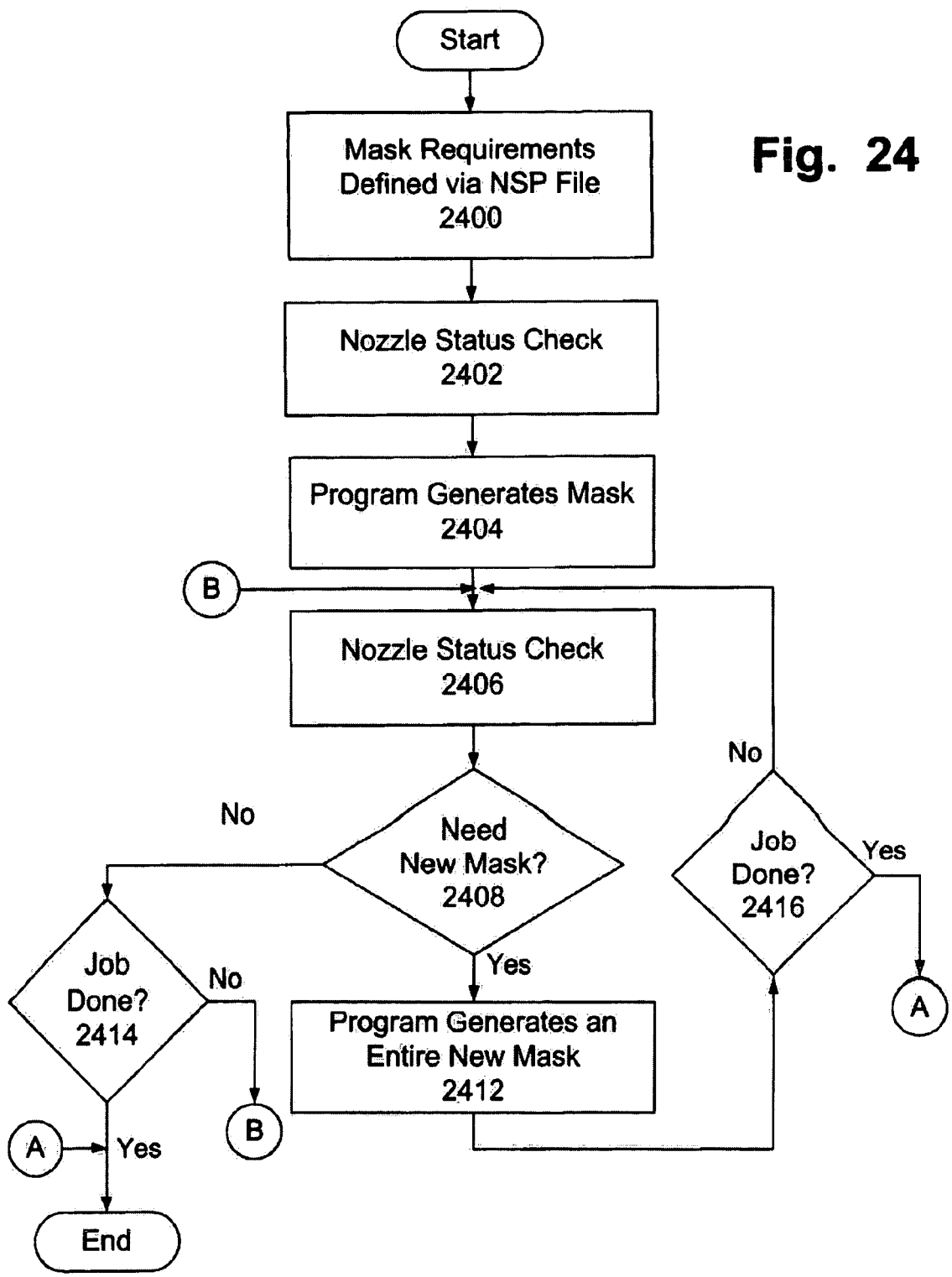
FIG. 24 is a flowchart of how conventional Shakes is used in generating new masks.

To help understand the present invention, here the process of using conventional Shakes (FIG. 24) is discussed first. Generally, the designer first determines his or her mask requirements. Based on such determination, the designer accordingly defines the desired mask by creating an NSP file 2400.

The status of each nozzle is then determined. This is preferably done by conducting a nozzle-status check 2402. Initial default values may also be assigned to the nozzles, for example, assigning "1" to each nozzle to indicate fully operational status.

The nozzle-weight detection system of the printer, preferably, directly interfaces with the Shakes program. The Shakes program is preferably implemented in firmware.

In one embodiment, the status/condition of each nozzle is stored in a "list" or "nozzle-list" object. This list object is directly processed by the detection system as well as directly interfaced with and processed by the Shakes program. This way, the detection system, including objects it maintains, may be directly processed by the Shakes processing firmware, without having to go to memory or having to modify an NSP file.

In the next basic operation, the Shakes program then generates a mask 2404, under the control of the control algorithm. A mask is generated guided by information such that defective nozzles are not used in the mask or used sparingly, thus optimizing the usage of the rest of the nozzles. The Shakes program generates each row of the mask considering the constraints defined in the NSP file.

A nozzle-status check may be conducted at a later time to determine the current or latest status/condition of the nozzles 2406. If the status of the nozzles has changed, an entire new mask is then generated by the Shakes program taking into account the current or latest status of the nozzles 2412. This means that each row of the mask is recalculated again considering the mask requirements and the latest nozzle status.

The generation of the new printmask is generally automatically done by the Shakes program. The condition, including characteristic, of each nozzle may also be checked, depending on the capability of available sensors. This assessment may include assessing nozzle outs and weak or misdirected nozzles.

Because the conventional Shakes program generates an entire mask from scratch (calculates and processes the mask requirements and generates all rows), there is considerable amount of unnecessary time used in generating the new mask. This time burden may be acceptable at initialization, but becomes cumbersome when multiple masks have to be created during a print job. This process of checking the nozzle conditions is done reiteratively until the print job or job process is done.

The present invention includes Shakes and improvements and enhancements thereof. One aspect of the present invention recognizes that between two nozzle-status checks or readings, only a small number of nozzles have their status changed. The present invention recalculates only mask rows containing at least one nozzle whose status has changed from a previous nozzle check or reading to a later reading. The generation of a new printmask thus can generally be done on the order of seconds and online.

While calculating these changed-nozzle-status rows or affected rows, the mask requirements, including constraints, defined by the designers are taken into consideration. Thus, a feature of the present invention does more than assigning preestablished or predetermined back-up nozzles; these rows are calculated and generated within the confines of the defined mask requirements.

An affected row is a mask row that contains or refers to at least one pass number or pixel location related to a nozzle whose status has changed from a previous reading. An affected row, for example, is a row being serviced by a nozzle which has become defective.

Figure 25:
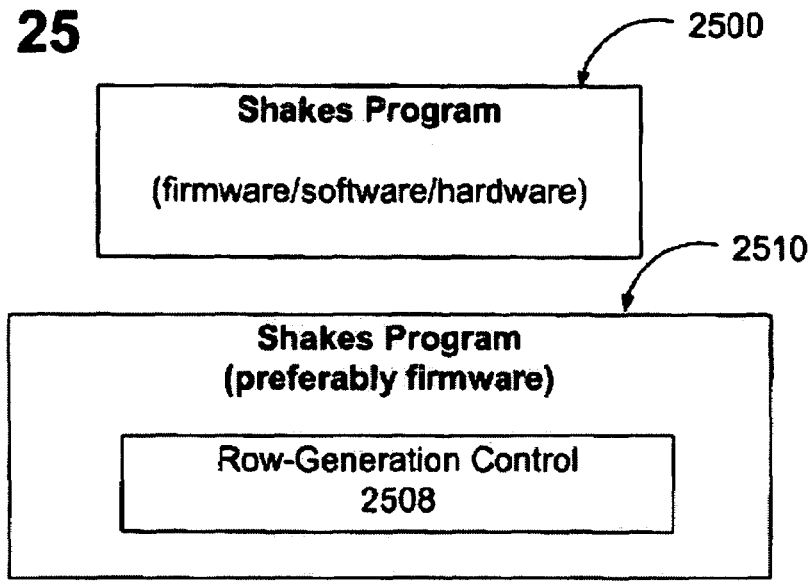
FIG. 25 is a basic block diagram showing a conventional Shakes program and an improved Shakes program that incorporates the features of the present invention.

To accommodate an embodiment of the present invention, an improved Shakes program 2510 (FIG. 25) is made by modifying and/or augmenting the conventional Shakes program 2500. In one preferred embodiment, the program preferably includes a module, a class, or lines of code, here called row-generation control 2508, so that the program does not generate an entire mask from scratch similar to the conventional program 2500, but only generates particular mask rows. These mask rows are those rows that contain or refer to nozzles whose condition has changed from a previous nozzle reading. Thus, row numbers could be input to this class or module.

One skilled in the art of programming understands that the features of the present invention may be implemented in a number of ways. For example, the additional features may be coded as additional classes or subclasses. They may also be coded as additional methods or properties of a class. They may be coded in firmware, hardware, or software, or a combination thereof.

Figure 26:
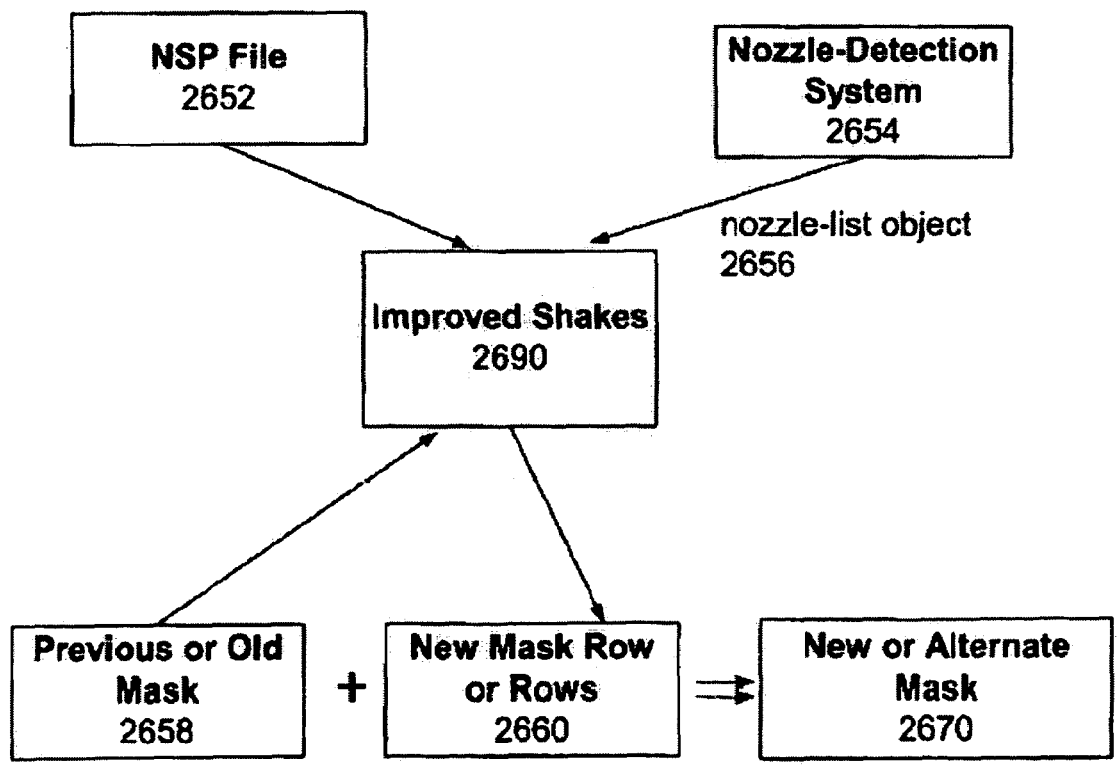
FIG. 26 is a basic data flow diagram of an improved Shakes in accordance with the present invention.

In general, the improved Shakes 2690 (FIG. 26) interfaces with various objects, files, systems, and the like. In its basic components, the improved Shakes 2690 determines the mask constraints by reading the NSP file 2652. The status or condition of each nozzle is obtained by the nozzle-detection system 2654. A list object 2656 is received/read and processed by the improved Shakes 2690.

The improved Shakes system or program 2690 determines which row or rows of the mask have to be recalculated anew. This set of rows 2660 is generated guided by the mask definition or requirements in the NSP file.

An older or previous mask 2658 is retrieved or read by the improved Shakes. Rows related or containing nozzles whose status has not changed (in the previous mask 2658) are combined with the new set of mask rows 2660 to generate or create a new or alternate mask 2670.

Figure 27A:
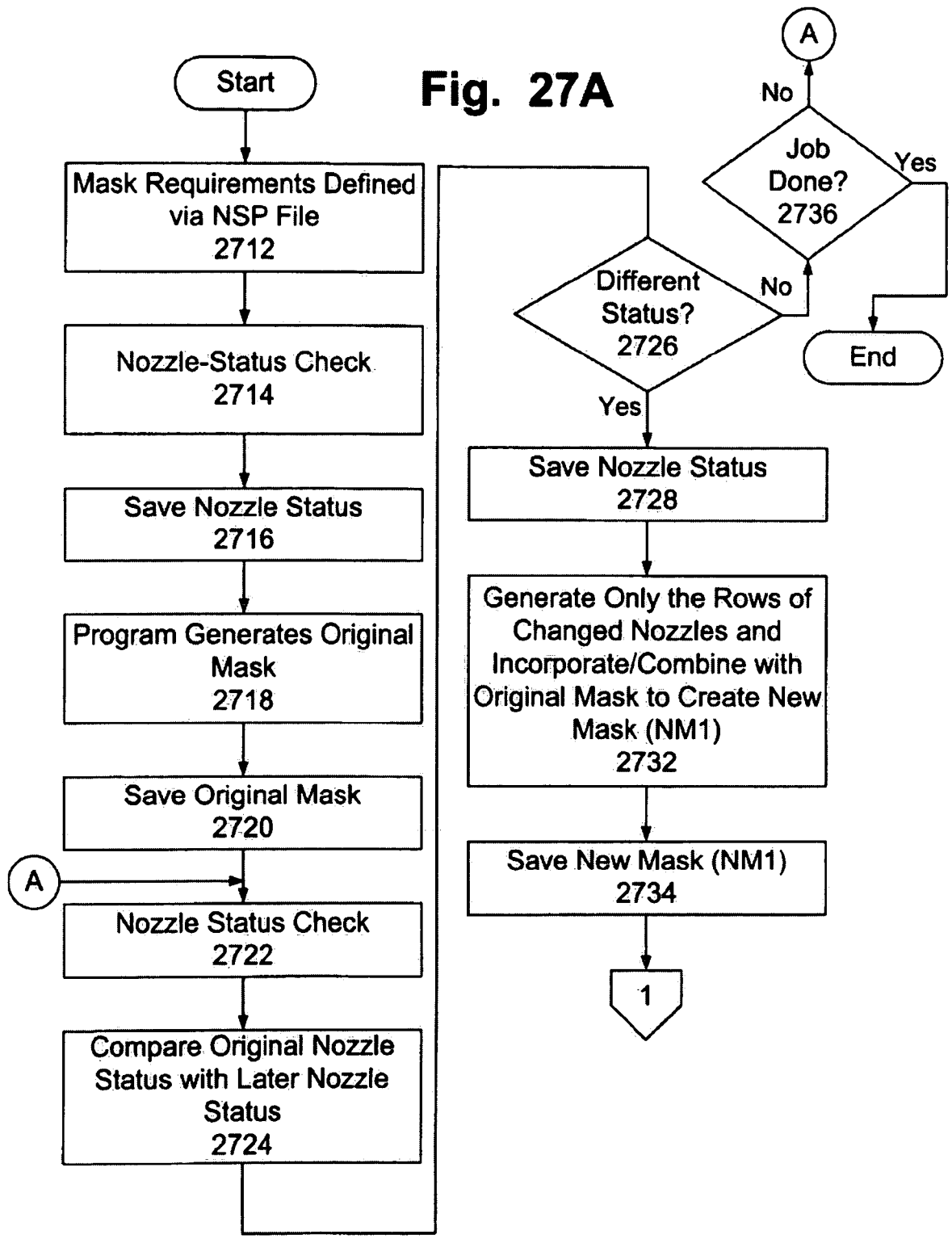
FIGS. 27A and 27B are flowcharts showing how the improved Shakes of the present invention generates new masks.
Figure 27B:
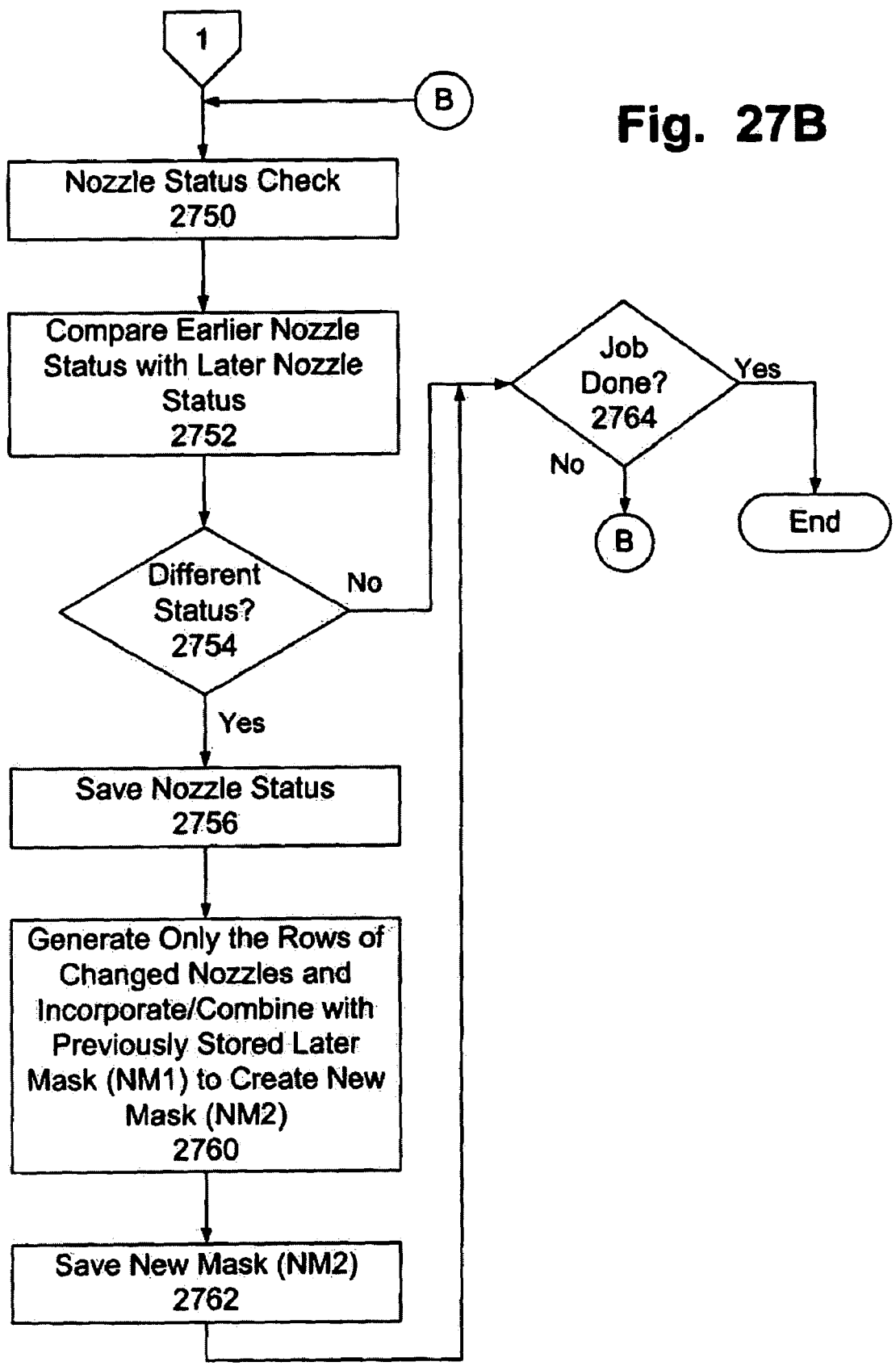

In the present invention, the process of generating masks is generally done in several operations (FIGS. 27A and 27B). Variations on how to implement the present invention, as well as its operations, are available. Some variations will be discussed herein.

In the first operation, the designer determines the mask requirements, including constraints. These requirements are defined in an NSP file 2712 (FIG. 27A).

The status of each nozzle is also determined. Preferably, a nozzle-status check 2714 is done. Alternatively, the status of each nozzle is set to a default value, such as "1," indicating that all nozzles are available and operational.

The status (default or based on reading) of each nozzle is then preferably saved 2716, for example, in a computer medium such as nonvolatile memory, volatile memory, or hard drive.

In the preferred embodiment, a list object contains the list of nozzles, including their weights. This way, the nozzle-detection system may directly interface with the improved Shakes program so that the result of a nozzle detection is directly fed into the improved Shakes, without having to go to disk, for example, to modify an NSP file.

If the embodiment of the invention, however, is implemented including a computer, the NSP file may be modified. This modification may include the current and/or previous status of each nozzle or the difference between the previous and the current status of each nozzle, or both.

The improved Shakes program is then called to generate an original mask considering the mask requirements defined 2718. This original mask is preferably saved 2720 in a data storage such as a memory or a hard disk drive. The generation of the original mask is generally similar to how a conventional Shakes program generates a mask.

After a certain time or condition, a later nozzle-status check 2722 may be done. A comparison 2724 is then done to compare the result of the original nozzle status 2714 with the later nozzle status check 2722. This comparison is preferably done automatically within the improved Shakes program.

In one embodiment, the previous and later or current status of each nozzle are stored. This way the improved Shakes program can automatically read the information and accordingly automatically compare which nozzle has its status or condition changed. This way, the affected rows are determined, thus indicating to the improved Shakes program the particular row or rows to generate.

In another embodiment, the historical condition of each nozzle is saved. They are preferably saved in objects, such as nozzle-list objects or list objects, which contain and keep track of the historical conditions of each nozzle.

It is possible that the status of the nozzles is not saved. Meaning, that only nozzles whose status is not fully operational (weight of 1.0) or whose condition is not one hundred percent are stored. What is important to store or save in this computer medium or media is information such that a program (software, firmware, or even hardware) can be able to discern the changes in nozzle status.

Criteria on how to define the conditions of a nozzle may be implemented in the control algorithm or in the Shakes program in general. For example, a nozzle who is ejecting below an ink threshold may be noted accordingly.

If the previous status-check results are different from the later status-check results 2726 such that it warrants the generation of a new mask, the later nozzle-status check 2722 conditions are then saved 2728, for example, in a hard drive.

Preferably, the differences of the earlier status and later status of the nozzles are automatically determined by the improved Shakes program or within the nozzle-detection system itself. This way, the affected rows are automatically determined and then calculated anew to generate the affected mask row or rows. In another embodiment, the list object may also contain the information such that the changed row or rows are tracked.

If the Shakes program is implemented with a computer or with a system that enables NSP modification, the improved Shakes program may thus also contain an automatic NSP-generation module or algorithm. This way, it may automatically compare the two nozzle-check results, determine which nozzles have changed, and automatically generate an NSP file so that no manual NSP file creation or modification is necessary.

The improved Shakes program is then called to generate only the affected rows in the mask that have nozzles whose status has changed 2732. This way, processing is done generally to generate only a small portion of the mask and not, unnecessarily, the entire mask. As discussed above, the row or rows generated conform to the mask requirements defined by the designer.

Once the row or rows are generated, the improved Shakes program combines them with the previously stored mask such that the new row or rows respectively replace the same rows in the previous mask 2732. This is further explained below via an example. The new mask (NM1) is then stored 2734, typically in a hard disk drive or in memory.

In one variation, all status-check results are automatically saved regardless of whether the previous and later status-check results are different. An additional step may be added such that if the previous results and the later results are the same, no row of the mask is generated.

Based on time or certain conditions, another nozzle-status check 2750 may be requested (FIG. 27B). A comparison of the previous nozzle-check results 2728 and the later nozzle-check 2750 results is then done by the improved Shakes program. If at least one nozzle status has changed, the later nozzle status results are then saved 2756. The program preferably then automatically generates the affected row or rows to generate a new mask—but generated within the confines of the original mask requirements and the later condition of each nozzle.

The affected rows are then combined with the previously stored mask (NM1), such that the affected rows in NM1 are replaced with the newly calculated mask rows 2760. This new mask (NM2) is then stored 2762 in a computer medium. The operations as shown above may be done reiteratively, generally meaning conducting a nozzle-status check, comparing the results from an earlier nozzle-status check, generating new mask row or rows, and creating a new mask using the generated mask row or rows and combining them with some rows of an earlier-saved mask.

An exemplary NSP file, illustrating some features of the present invention, is listed below. The text following the pound sign ("#") indicates comments.

In this exemplary file, two constraint matrices are defined as weighters: mtrMust and mtrWant. Each matrix is defined between the "matrix" and "endmatrix" keywords. The "X" in each matrix indicates the pivotal point, while "1" indicates a restricted or forbidden value, and "0" indicates a nonrestricted or allowed value.

There are two list sections in this exemplary file. Each list section is defined between the "list" and "endList" keywords. The list section indicates the status value of each nozzle. Nozzle weights may also be indicated, if such feature is part of the Shakes program.

If the printer sensor is able to detect also misdirected or weak nozzles, this information can also be used to minimize and condition the usage of these nozzles. For instance, such a nozzle may be used with particular weights that disfavor repetitive functioning in consistent positions within a swath, so that the nozzle adds to inking but does not significantly contribute to swath-edge banding.

The first list section in this file indicates that there are ninety-six nozzles. Each nozzle is available for use—value "1."

List sections may also be implemented as list objects. In the preferred embodiment, the nozzle-detection system directly interfaces with the Shakes program through these list objects. This way, the NSP file need not be updated or changed at all. Automatic generation of new printmasks after nozzle detection, without change to any NSP file, may thus be done.

A mask called normalMask1 is also defined in this file. It is defined specifying the greedyMask algorithm, which is a mask-generation algorithm that considers values of cell neighbors, the relative condition of the nozzle (e.g. type and severity of nozzle malfunction or misbehavior) that would be used for the current cell, the distribution of nozzle usage, and/or other several other factors.

The mask normalMask1 is defined to be an eight-pass mask that has ninety-six rows and ninety-six columns (96× 96). The value after the keyword "random" (within the greedyMask section) indicates the degree of randomness of the mask desired by the designer.

The matrices, mtrMust and mtrWant (defined above), each has a weighter value; "0.999" for mtrMust and "0.8" for mtrWant. These values indicate the relative weight of each matrix. Thus, here the designer is giving more importance to mtrMust than to mtrWant. Moreover, the condition "nozz 1" indicates that if no candidate is found, no mask should be generated.

The previous or earlier conditions of nozzles are defined in the first list section ("list nozz"). The later conditions (i.e. later than the first "list nozz" reading/detection) are defined in the second list section ("list nozz2"). As discussed above, the second list section is preferably also implemented as a list object.

In this exemplary NSP file, nozzle 1 is noted to be defective. "[1:0]" indicates that nozzle 1 should not be used ("0"). If nozzles 5 and 9, for example, are also found to be defective, "[5:0]" and "[9:0]" would also be coded in the second list section. In this case, only nozzle 1 is noted defective. Default values may also be coded here.

The second list section also indicates that there are ninety-six nozzles. Each nozzle has a value of "1," indicating that each nozzle may be used, except for nozzle 1—which should not be used.

The exemplary NSP file also contains a newMask section. This section informs the improved Shakes program to apply the new (second) nozzle list, nozz2, to the previously-generated mask, normalMask1. Note that the same weighters used in generating normalMask1 are also used in generating the new mask called normalMask2.

This means that the features of the present invention generally apply when the mask definition or requirements are the same for the earlier mask and the new mask to be created. They generally differ only on nozzle status or condition. A change in matrix weighters generally means that a new entire mask (all rows) has to be generated, so that the mask definition or requirements, including constraints, as defined by the designer are followed.

The improved Shakes program may also be programmed in such a way that it automatically generates an entire mask (all rows) when certain mask requirements and constraints change from the previous mask to the new mask. This may be done if user input, particularly NSP input, is enabled within the system, for example, via a computer or an input device.

The exemplary NSP file below also indicates that the masks, normalMask1 and normalMask2, are to be stored/saved in a file called nsp.8.96-1.scm and nsp.8.96-2.scm, respectively.

Nsp.8.96-2.scm (normalMask2) should only have eight rows different from Nsp.8.96-1 (normalMask1), considering that the output mask (normalMask2) is an eight-pass mask and only one nozzle, nozzle 1, is found defective.

Example NSP File Applying the Present Invention:

```
#   Two constraint matrices: mtrMust and mtrWant
matrix mtrMust
    { 0 1 0 }
    { 1 X 1 }
    { 0 1 0 }
endmatrix
matrix mtrWant
    { 1 0 1 }
    { 0 X 0 }
    { 1 0 1 }
```

-continued

```
endmatrix
#   First list section, all nozzles available for use
list nozz
    nozzles 96
    default 1
endList
#   Defines an eight-pass 96 x 98 mask called normalMask1
greedyMask normalMask1
    define
    {
        size (96, 96)
        passes 8
    }
    with
    {
        mtrMust 0.999
        mtrWant 0.8
        nozz 1
    }
    random 0.1
endGreedyMask
#   Second list section, nozzle 1 defective
list nozz2
    nozzles 96
    default 1
    [1:0]
endList
#   newMask section
newMask normalMask2
    apply
    {
        mtrMust 0.999
        mtrWant 0.8
        nozz 1
        random 0.1
    }
    to normalMask1
endNewMask
#   output files
output normalMask1 to nsp.8.96-1.scm
output normalMask2 to nsp.8.96-2.scm
```

In a preferred embodiment, the normalMask1 has been previously generated and is permanently or temporarily saved in memory. When the improved Shakes program reads the above NSP file, it compares the two list sections, or objects if implemented that way, to determine which nozzles have changed.

It may also compare the mask requirements of each mask (normalMask1 and normalMask2) to see if there are changes. If the mask requirements are substantially different from each other (for example, the weighters for mtrMust and mtrWant are different for normalMask1 and normalMask2), the improved Shakes automatically generates an entire new mask (all rows).

In a preferred embodiment of the invention, mask requirements cannot be changed. This way, the improved Shakes program knows only to look at the list objects to see if nozzle condition changes exist.

Variations on how nozzle status or vari-state nozzle values are indicated may also be implemented. For example, a value of "0" indicates that the nozzle should not be used or is totally inoperative. A value of "1" indicates that the nozzle is fully operational and may be used all the time. A value of "0.5" indicates that the nozzle may be used fifty percent (50%) of the time.

One of ordinary skill in the art of programming understands that variations of the NSP file may be done and yet be in spirit of the present invention. For example, different keywords may be used to define the various sections. Furthermore, how nozzle list sections or list objects are defined and implemented may be different from the one described in this application and yet be in spirit of the present invention. How the nozzle-detection system and the improved Shakes program interface with these objects may also be done in a number of ways, for example, via another object or module.

Nonnumeric and nonalphabetic values may also be used, for example, instead of using the value of "1" to indicate that the nozzle may be used, "ONE" or "NOZZ-OK" may be used instead. Different variations of NSP files, as well, as Shakes program code may also be created to implement the present invention.

It is also possible that the features of the present invention be implemented outside of the Shakes program in general. In other words, the features of the present invention are coded in one or more program components, which are not part of the Shakes program but may be accessed or called by it.

This program may also be created for example, using a different programming language, or may be created as a dynamic link library (DLL). The Shakes program calls and interfaces with this program. The output files of Shakes are accessible to this program.

Figure 28:
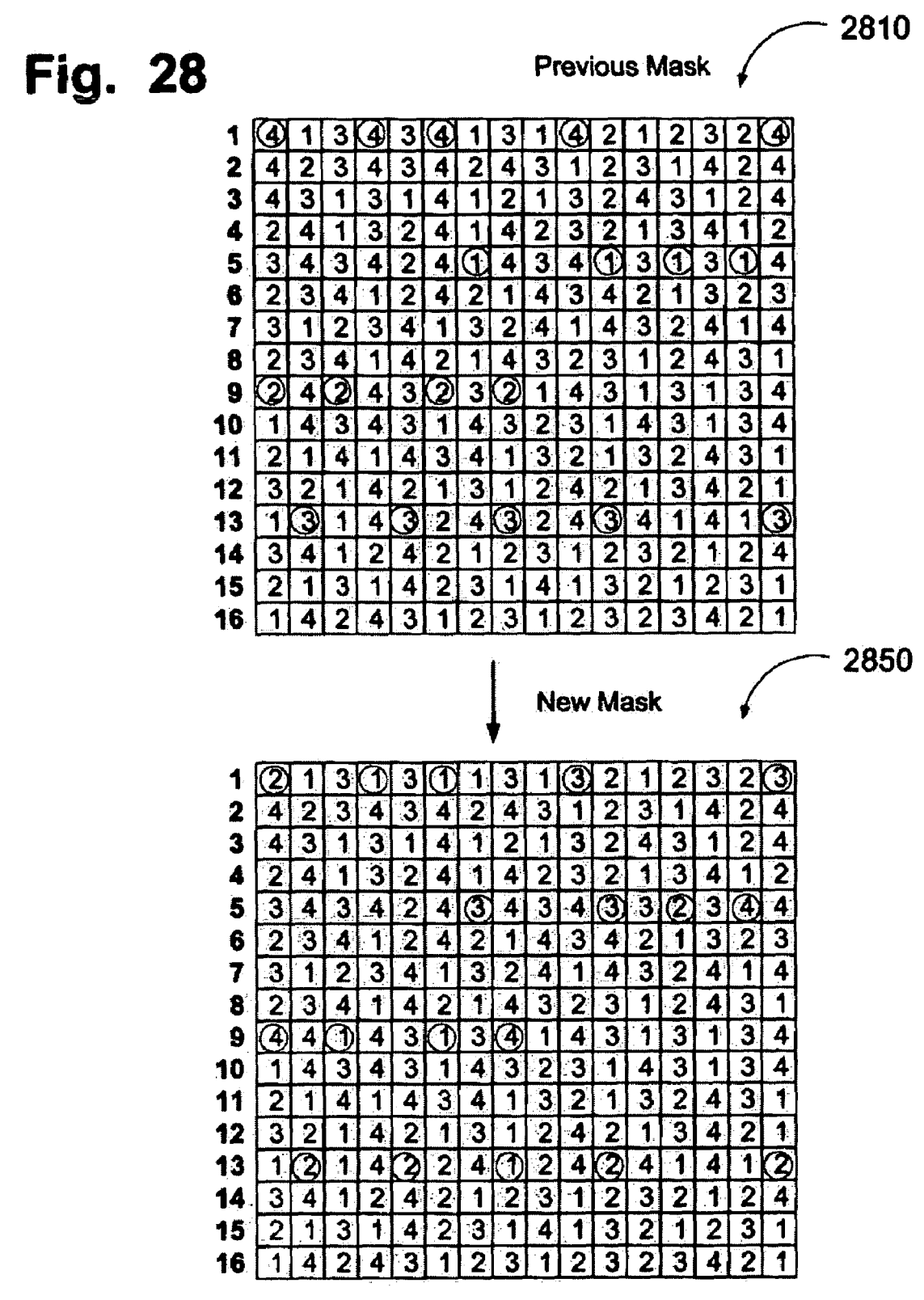

To explain how a new mask is generated, consider for example two sixteen-by-sixteen (16×16) four-pass masks (FIG. 28). The bold numbers to the left and outside of the masks 2810, 2850 are row numbers, which are not part of the masks.

The top mask 2810 is generated first; the bottom mask 2850 is generated later and is based on the previous top mask 2810. In one embodiment, the top mask 2810 (all rows) is generated during printer initialization by an improved Shakes program. This mask is based on an NSP file formulated by a designer.

For simplification purposes, assume that the mask uses a pen or printhead with eight nozzles. In the top mask 2810, all nozzles are operational and available for use. The bottom mask is created considering that nozzle one (nozzle 1) is defective.

Note that the features of the present invention are is based on noticing incremental changes in nozzle status. This means that the definition of the nozzle list in the NSP file or in list objects is such that the improved Shakes program can use a previously-generated mask and its associated nozzle status, and based on these items generate only the appropriate rows by knowing the changes in nozzle conditions, and in some circumstances, the degree or condition of nozzle change.

Thus, it is possible, that a new mask is generated using one generated from three previous iterations ago as long as the improved Shakes program knows which mask to use and the incremental changes from that previous mask to the current or later nozzle conditions that are going to be used in generating the new mask. This way the improved Shakes program will have the correct mask and nozzle status basis to generate the new mask.

Going back to the two exemplary masks 2810, 2850, considering that nozzle one (nozzle 1) prints in pass four in row one, pass one in row five, pass two in row nine, and pass three in row thirteen, rows one, five, nine, and thirteen are those affected due to defective nozzle one (nozzle 1). These rows are to be replaced. The affected pass numbers are marked with a circle.

In one embodiment, the improved Shakes program receives these row numbers as input or through internal calculation determines the rows that have to be generated. The improved Shakes program thus generates only these rows guided by the mask requirements, including constraints, defined in the NSP file.

Once the affected rows are calculated, the improved Shakes program uses the previous mask, retrieves rows which are not affected from this mask, in this case—rows two through four, six through eight, ten through twelve, and fourteen through sixteen, and combines them with the newly calculated rows (rows one, five, nine, and thirteen) to create a new mask generally in seconds. Comparing the previous mask 2810 and the later mask 2850, they differ only by four rows—because nozzle one being defective entails only four rows being affected (four-pass mask).

Although for the present example the pass numbers or pixel locations directly affected by the defective nozzle 1 are the only ones changed, other pass numbers in the affected rows may also be changed. For example, row one of the new mask may read "2 1 2 1 3 2 1 3 1 3 2 1 2 3 2 3" rather than "2 1 3 1 3 1 1 3 1 3 2 1 2 3 2 3," as shown in the bottom mask 2850. Whether other pass numbers are changed depends on the mask requirements.

B. Number of Mask Rows to Recalculate

Introduction

It is particularly interesting to note the relationships between the number of rows that must be recalculated, in using this invention, and the number that require recalculation in a more-conventional system. It is also noteworthy to see how the number of rows to recalculate varies strongly with the frequency of nozzle checking, and other operating conditions.

With the invention, the number of mask rows to be reworked depends upon the number of disabled, or impaired, or downweighted nozzles. That dependency can be very nonlinear and complicated, because two or more such nozzles may happen to be servicing a single pixel row.

In the general case, therefore, the number of mask rows to be refurbished can be expressed only statistically. A rough idea of this relationship is developed below.

This development will begin with an orientation to the peculiar sort of mathematics that must be used in dissecting the assignment of nozzles to rows, in a plural-pass system. As will be seen, the notation is akin to the "modulo" or "remainder" mathematics used in analyzing certain games of chance.

Both these environments involve kinds of cyclical phenomenon. In these contexts, the importance of the exact current remainder, or what is left over after numerous cycles, is typically equal to or greater than the importance of the number of cycles.

The overall objective is to determine the number of rows that will require modification, after a nozzle check has established which nozzles are disabled or impaired. We define:

N nozzles in the pen p number of passes and:

Q=N/p

In a very simple printmode—one with consistent advance for all of the passes, and Q an integer—Q is the advance after each pass, expressed in units of number of nozzles along the pen. This is most commonly the same as number of pixel rows along the printing medium or the image.

In this field, the quantity Q=N/p actually is a fundamental one. As will be seen, it reappears with several different physical significances.

Given a list or set of "modified" nozzles $n=\{n_i\}$ (the values i are integers), we have to calculate the remainders of the division of each of these nozzles by Q. (The number of elements in the set n will be written I or sometimes $I_n$.)

Such a remainder calculation focuses attention upon the way in which two or more nozzles can serve a particular pixel row in an image—and the way in which two or more pixel rows are served by a particular nozzle. The remainder is symbolized:

$m \equiv \{m_i\} \equiv \{n_i \bmod Q\}$, in which the function "mod" represents modulo division—i.e., division in which the part of the answer that is of interest, and is retained, is the remainder rather than the integral (whole number) portion.

Each $m_i$ is a value between 0 and Q−1 inclusive. We also define D as the number of different $m_i$ values. This quantity D is a number between 1 and Q.

Finally the number of rows affected by the one or more nozzles $n_i$ is: D·p.

As an example consider a 16-row, 16-nozzle, 4-pass mask, and assume that three nozzles—nozzles number 1, 3 and 9—have newly become impaired or recovered, and therefore have newly changed weights. We have:

$\underline{N} = 16$ $\underline{p} = 4$ $\underline{Q} = \underline{N}/\underline{p} = 16/4 = 4$ $\underline{n} = \{\underline{n}_1, \underline{n}_2, \underline{n}_3\} = \{1, 3, 9\}$ $\underline{m} = \{\underline{n}_1 \bmod \underline{Q}, \underline{n}_2 \bmod \underline{Q}, \underline{n}_3 \bmod \underline{Q}\}$ $= \{1, 3, 1\}$, and now, because in the set of three remainders $\{\mathbf{1, 3, 1}\}$ there are only two different values (namely 1 and 3),

D=2.

Therefore the number of rows affected is: D·p=2·4=8 rows. This is smaller than $\underline{R}_0 = $ (changed nozzles) × (passes)

$= I \cdot \underline{p}$ $= 3 \cdot 4$ $= 12$ rows.

Somewhat more formally or technically, this could all be summarized by writing: we define Q as the number of nozzles divided by the number of passes of the mask; and then we say that two nozzles are "equivalent" if they have the same value modulo Q. Then the number of rows changed is the number of nonequivalent nozzles multiplied by the number of passes.

The quantity $R_0$ just introduced may be conceptualized as a kind of "nominal" or baseline prediction of the number of rows requiring rework—corresponding to a relatively new printhead in very good condition. $R_0$ may also represent a somewhat older printhead that was only just recently tested, so that relatively few impaired nozzles have been discovered in a current test.

Continuing the same example of a 16-row, 4-pass mask—i.e. with Q=4—close consideration of the table below reveals that row 1 uses the same nozzles as rows 5, 9 and 13. The same happens with rows {2, 6, 10, 14}, . . . the only difference being the specific passes in which they print. Therefore to check the modified rows we only have to check the first Q rows.

What all the nozzles printing in each row have in common is the remainder of the division by Q. Hence, as suggested earlier, the idea which unifies all these observations is that it is possible to find whether the nozzles fall in (i.e., print on) a common row (or rows) by checking the remainders of their division by Q.

Stated more precisely, what is divided by Q is their nozzle numbers: if the remainders are the same, then the nozzles affect the same row(s) in common. If so, then only this row (or these rows) will have to be calculated.

Various terminologies can be helpfully used to describe the groupings of nozzles that have common values modulo Q: the nozzles (whether recently modified or not) can be grouped into "sets", or conceptualized as "teams" which share the responsibility for printing the same rows—but on different passes. All the nozzles in each set or team can (if not impaired) print on the same rows and thus can substitute for one another.

Therefore all the nozzles in each grouping are in a certain sense equivalent to one another, and the teams or sets may accordingly be called "equivalence classes". In this discussion of the number of mask rows to recalculate, these terms will all be used interchangeably.

Basically if D is 1 then all the nozzles print on a single common row. If D is 2 there are two affected rows, and so on. Then multiplying D by the number of passes yields the total number of rows affected in the mask.

Below are tables for four- and eight-pass masks, illustrating which nozzle prints at each row. Nozzles printing in a four-pass mask are:

| row | pass 1 | pass 2 | pass 3 | pass 4 |
|-----|--------|--------|--------|--------|
| 1   | 13     | 9      | 5      | 1      |
| 2   | 14     | 10     | 6      | 2      |
| 3   | 15     | 11     | 7      | 3      |
| 4   | 16     | 12     | 8      | 4      |
| 5   | 1      | 13     | 9      | 5      |
| 6   | 2      | 14     | 10     | 6      |
| 7   | 3      | 15     | 11     | 7      |
| 8   | 4      | 16     | 12     | 8      |
| 9   | 5      | 1      | 13     | 9      |
| 10  | 6      | 2      | 14     | 10     |
| 11  | 7      | 3      | 15     | 11     |
| 12  | 8      | 4      | 16     | 12     |
| 13  | 9      | 5      | 1      | 13     |
| 14  | 10     | 6      | 2      | 14     |
| 15  | 11     | 7      | 3      | 15     |
| 16  | 12     | 8      | 4      | 16     |

(These same values, but in very slightly different form, will be repeated in a closely related example, in a later subsection of this detailed description.)

In the next case Q=2, so that D can only be 1 or 2. If D is 1, it is necessary to calculate eight rows of the mask (for example in the case of nozzles {1, 7, 11}). If D is 2 (for example in the case of {1, 2}) it is necessary to process the entire mask. Thus, nozzles printing in an eight-pass mask are:

| row | pass 1 | pass 2 | pass 3 | pass 4 | pass 5 | pass 6 | pass 7 | pass 8 |
|-----|--------|--------|--------|--------|--------|--------|--------|--------|
| 1   | 15     | 13     | 11     | 9      | 7      | 5      | 3      | 1      |
| 2   | 16     | 14     | 12     | 10     | 8      | 6      | 4      | 2      |
| 3   | 1      | 15     | 13     | 11     | 9      | 7      | 5      | 3      |
| 4   | 2      | 16     | 14     | 12     | 10     | 8      | 6      | 4      |
| 5   | 3      | 1      | 15     | 13     | 11     | 9      | 7      | 5      |
| 6   | 4      | 2      | 16     | 14     | 12     | 10     | 8      | 6      |
| 7   | 5      | 3      | 1      | 15     | 13     | 11     | 9      | 7      |
| 8   | 6      | 4      | 2      | 16     | 14     | 12     | 10     | 8      |
| 9   | 7      | 5      | 3      | 1      | 15     | 13     | 11     | 9      |
| 10  | 8      | 6      | 4      | 2      | 16     | 14     | 12     | 10     |
| 11  | 9      | 7      | 5      | 3      | 1      | 15     | 13     | 11     |
| 12  | 10     | 8      | 6      | 4      | 2      | 16     | 14     | 12     |
| 13  | 11     | 9      | 7      | 5      | 3      | 1      | 15     | 13     |
| 14  | 12     | 10     | 8      | 6      | 4      | 2      | 16     | 14     |
| 15  | 13     | 11     | 9      | 7      | 5      | 3      | 1      | 15     |
| 16  | 14     | 12     | 10     | 8      | 6      | 4      | 2      | 16     |

Frequent vs. Infrequent Nozzle Checking

Another variable that controls the number of rows to be recalculated is the frequency with which nozzle condition is checked. If nozzle health is monitored by very frequent tests, then after each test there is likely to be only a very small number of nozzles that are newly found to be disabled or require downweighting.

If testing is much less frequent, however, there are two important results: (1) a larger number of impaired nozzles will probably be found; and (2) more than one of these nozzles are likely to be addressing a single common row, or common rows. More generally, plural impaired nozzles are likely to be addressing each one of plural common rows, and this redundancy greatly complicates estimating the number of rows to be recalculated.

For instance in, say, a 600-nozzle printhead, with frequent tests the number I of newly impaired nozzles may be only one nozzle or perhaps a dozen nozzles. In this case, the number of rows to be reworked is probably that number I of downweighted or disabled nozzles, multiplied by the number of rows addressed by each nozzle within each swath height (i.e., within the height of the printhead).

That latter number of rows is ordinarily equal to the number p of passes in the printmode. Therefore, for this frequent-checking case, the number of rows to rework is likely just the baseline or nominal value introduced earlier, $R_0 = I \cdot p$.

For the infrequent-checking case, unfortunately, no such extremely simple calculation is sufficient. As will be seen shortly, actual models are considerably more elaborate.

The comments above assume that the printmode is a classical type in which the printing medium shifts or advances by a consistent distance between each successive pair of passes. (This situation is much simpler than for printmodes in which the advance distance varies, as for example in the previously mentioned Zapata and Askeland patents.)

In this simple, consistent-advance kind of procedure, the advance distance is simply a certain fraction 1/p of the printhead height. This implies that each nozzle addresses a successively different row of the image (and mask), after each advance.

In other words, after a particular nozzle writes on a first particular row, the printing medium advances (i.e. is shifted) under that nozzle by a distance equal to 1/p times the printhead height. The nozzle can then write on a different row, which is farther along the printing medium by that same distance.

After p passes and advances, the nozzle writes on a row that is displaced from the first row by a distance equal to the height of the printhead. Naturally the same is true for every nozzle in the printhead.

Another way to think of exactly the same process is that each row of the image/mask is addressed by a different nozzle of the printhead, in turn—up to a total of p nozzles. Then, after p passes, the successive advances of the printing medium shift that image row past the end of the printhead.

(The number of nozzles actually printing on, as distinguished from "addressing", each row is not constant. As nozzles become disabled, the number can decrease from p to, ultimately, zero.)

If instead measured in printmask rows, or image rows, rather than in "distance" as such, the advance (or "advance stroke") is N/p rows, where N is the total number of nozzles in the printhead. (People skilled in this field will recognize that this second expression is also based on an assumption that the spacing between nozzles, along the printhead, equals the spacing between rows in the mask or image.)

Frequent Nozzle-Checking Model

When the number of newly detected questionable nozzles is quite small, as suggested above, then for masks of practical modern size there is a very small probability that any two or more of those newly disabled or newly down-weighted units is capable of addressing any particular row, in common. In this case there is little need, probabilistically, to take account of any redundancy—that is to say, of the possibility that two or more of the newly disabled nozzles, in common, will address any particular row.

Therefore in this basic case, once again, probably the number of rows to rework is simply $R_0=I \cdot p$, or—in words—the product of the number of newly disabled nozzles and the number of passes in the printmode. This number of rows to be reworked is relatively small because the number I of newly disabled nozzles is small; however, this situation has important drawbacks:

(1) considerable time, and considerable cost of ink and printing medium, are required for frequent nozzle testing—and in general this time far exceeds the time required to recalculate mask rows;

(2) since there is probably no redundancy in row coverage, little or no time can be saved by reworking redundant rows only once; and (3) in some systems, nozzles may deteriorate in a strongly nonmonotonic fashion, so that very frequent testing may find each deteriorating nozzle in a significantly different state, every time it is tested—in particular, sometimes better than in the previous test—thus putting the system to a significant amount of computational work that almost immediately becomes obsolete.

Frequent checking, on the other hand, does yield an important advantage: the mask is always kept very nearly optimized, for whatever number of nozzles may be operating poorly or not at all. Therefore print quality should be maximal.

Infrequent Nozzle-Checking Model

As suggested above, all mask rows are serviced by more than one nozzle (provided only that the number of passes exceeds one). Due to this redundancy, more than one out-of-service or impaired nozzle can affect one or more common mask rows.

Therefore in the general case the number R of rows to be reworked is not simply equal to the number I of failed nozzles times the number p of mask rows addressed by each nozzle—that calculation would produce an overly high value. Nevertheless, as stated above, for quite small values of I it is a fair starting point, $R_0=I \cdot p$, where p is initially the number of passes in the printmode.

It is necessary to subtract some number of rows corresponding to the probable redundancy. This correction has to be "probable" because nozzles fail in patterns (along the printhead) that are partly random, not perfectly correlated with the patterns of nozzles serving common mask rows.

As the number of failed nozzles increases, the incremental pattern becomes progressively less random—because the system is programmed to redistribute the printing load in ways that increase the stress on (and therefore failure rate of) nozzles which serve the same pixel rows as the already-failed nozzles. For a relatively new printhead, however, this cascading effect is small.

The effective redundancy correction may start with estimating the probability of two failed nozzles affecting the same mask row—for each failed nozzle. For a new printhead the number N of nozzles is high, typically at least several hundred, and the number I that has newly failed is still relatively low, typically a few nozzles up to a few dozen nozzles. Therefore at the outset it is reasonable to disregard the possibility of three or more failed nozzles affecting the same row.

Given that a particular nozzle has failed and affects a particular row, and assuming still-mostly-random failure patterns along a relatively new head, the analysis can proceed as follows. Variables are:

$n=\{n_1, \ldots n_I\}$, the set of nozzles that are impaired,

I=the number of nozzles in the set n, p=number of passes of the mask,

N=number of nozzles in the pen, and $P_1$=probability of a second weak nozzle in the same row.

For a given number of nozzles and passes, as noted earlier there is a fixed number of sets n, each set initially having p elements, of different nozzles $n_i$ that affect each row. The number of sets n of nozzles $n_i$ is the fundamental Q=N/p (also equal to the advance expressed in numbers of nozzles or pixel rows, as previously noted).

For example in an eight-nozzle, two-pass mask the nozzles printing at each row in each pass are:

| row | pass 1 | pass 2 |
| --- | --- | --- |
| 1 | 1 | 5 |
| 2 | 2 | 6 |
| 3 | 3 | 7 |
| 4 | 4 | 8 |
| 5 | 5 | 1 |
| 6 | 6 | 2 |
| 7 | 7 | 3 |
| 8 | 8 | 4 |

—and the 8/2=4 different sets of nozzles printing at each row are:

{1, 5}, {2, 6}, {3, 7}, {4, 8}.

For a sixteen-nozzle four-pass printmode the same foregoing interpretation yields:

| row | pass 1 | pass 2 | pass 3 | pass 4 |
|-----|--------|--------|--------|--------|
| 1   | 1      | 13     | 9      | 5      |
| 2   | 2      | 14     | 10     | 6      |
| 3   | 3      | 15     | 11     | 7      |
| 4   | 4      | 16     | 12     | 8      |
| 5   | 5      | 1      | 13     | 9      |
| 6   | 6      | 2      | 14     | 10     |
| 7   | 7      | 3      | 15     | 11     |
| 8   | 8      | 4      | 16     | 12     |
| 9   | 9      | 5      | 1      | 13     |
| 10  | 10     | 6      | 2      | 14     |
| 11  | 11     | 7      | 3      | 15     |
| 12  | 12     | 8      | 4      | 16     |
| 13  | 13     | 9      | 5      | 1      |
| 14  | 14     | 10     | 6      | 2      |
| 15  | 15     | 11     | 7      | 3      |
| 16  | 16     | 12     | 8      | 4      |

Here, the 16/4=4 different sets of nozzles printing at each row are:

$\{1, 5, 9, 13\}, \{2, 6, 10, 14\}, \{3, 7, 11, 15\}, \{4, 8, 12, 16\}$.

Going back to the probabilities, we assume that a first nozzle failure has occurred in a particular row. With this assumption, the probability of a second disabled nozzle (that is to say, one additional nozzle) happening to affect the same row or "be in the same team" is:

$$P_1 = \frac{p-1}{N-1}.$$

Next, if we call $P_2=\{$probability of a third disabled nozzle also happening to affect the same row$\}$, then:

$$P_2 = P_1 \frac{p-2}{N-2} = \frac{p-1}{N-1} \cdot \frac{p-2}{N-2}.$$

in which the subscript "2" is used to designate the second additional disabled nozzle, beyond the first. Hence, generalizing now, $P_k=\{$probability of k additional disabled nozzles likewise affecting the same row$\}$ is:

$$P_k = \prod_{i=1}^{k} \frac{p-i}{N-i}.$$

If we have a set $n=\{n_1, n_2, n_3\}$ of three disabled nozzles, the probability of two additional (i.e., beyond the first) disabled nozzles affecting one common row is:

$P\{\{n_1, n_2\}$ in the same row$\}+P\{\{n_1, n_3\}$ in the same row$\}+P\{\{n_2, n_3\}$ in the same row$\}$.

This sum is the number of combinations of three nozzles taken in sets of two (familiarly represented by the well-known binomial coefficient), times the probability $P_1$. So the probability, with a set of I disabled nozzles, of having k of the additional ones turn out to affect the same row is:

$$P_k = \frac{I!}{k!(I-k)!} \cdot \prod_{i=1}^{k} \frac{p-i}{N-i}.$$

A deeper analysis will be presented below, but this relatively simple expression is adequate to convey the general flavor of the numerical results.

As a sample, if we have p=4 passes, N=600 nozzles, and I=10 disabled nozzles, we have:

$$P\{k=2\} = \frac{10!}{2! \cdot 8!} \cdot \frac{4-1}{600-1} = \frac{135}{599},$$

and $$P\{k=3\} = \frac{10!}{3! \cdot 7!} \cdot \frac{4-1}{600-1} \cdot \frac{4-2}{600-2} = \frac{120}{358,202}.$$

Assuming only I=2 disabled nozzles, however, yields instead:

$$P\{k=2\} = \frac{2!}{2! \cdot 0!} \cdot \frac{4-1}{600-1} = \frac{3}{599} = 0.5\%.$$

This partial analysis merely confirms that with frequent testing, as asserted in the preceding subsection, the probability of two or more disabled nozzles printing in the same row is very low.

In the above-analyzed 600-nozzle four-pass mode with two disabled nozzles, it is necessary to rebuild only four rows in 3/599=0.005 of all testings—or in other words in only 0.5 percent of the cases—and only eight rows of the 600-row mask most of the time (i.e. 99.5% of the cases).

The foregoing presentation finds P{k} as the probability that k of the I impaired nozzles are in the same equivalence class. The numerical results, as noted above, are progressively less accurate for relatively larger numbers I of questionable nozzles. The reason, very specifically, is that the derivation neglects the possibility that some of the remaining (I−k) impaired nozzles may be in the same equivalence class as the original k duplicates—or as one another.

It can be shown that a suitable correction factor κ (i.e., representing the probability that none of the remaining impaired nozzles is in the same class as the original k duplicates or as one another) is:

$$\kappa = \frac{(N-p)(N-2p)\cdots(N-Ip+kp)}{(N-k)(N-k+1)\cdots(N-I+1)}.$$

There are (I−k) factors in the numerator and the same number in the denominator. This expression can be written more compactly:

$$\kappa = \prod_{i=1}^{I-k} \frac{N-ip}{N-k-i+1}.$$

With this correction, a more-accurate expression for P{k} is:

$$P\{k\} = \kappa \cdot \frac{I!}{k!(I-k)!} \cdot \prod_{i=1}^{k} \frac{p-i}{N-i}$$

$$= \frac{I!}{k!(I-k)!} \cdot \prod_{j=1}^{I-k} \frac{N-jp}{N-k-j+1} \cdot \prod_{i=1}^{k} \frac{p-i}{N-i}.$$

This analysis provides a good estimate of the number of rows to be recalculated, no longer limited to the assumption that just a few nozzles have failed. This expression takes into account not only the probability that two of the I impaired nozzles affect the same rows, but also that possibly three or more of them do, or that there are several pairs (or triplets or quadruplets, etc.) affecting distinct sets of rows.

Evaluation of the correction factor κ and thus of the corrected expression for P{k}, being somewhat tedious, is naturally best performed by a simple script in a computer or advanced hand calculator. For the two cases presented above, the corresponding values of the probability—with and without correction—are:

|  | original value, above | correction factor K | corrected value |
|---|---|---|---|
| for I = 10 impaired nozzles: |  |  |  |
| P{k = 2} | 0.225 | 0.843 | 0.190 |
| P{k = 3} | 0.000335 | 0.887 | 0.000294 |
| for I = 2 impaired nozzles: |  |  |  |
| P{k = 2} | 0.005 | 1.000 | 0.005 |

When used to find the number of mask rows that will, on average, be recalculated, these probabilities reveal an important result: exploiting the redundancy in rows affected by each impaired nozzle enables significant saving of calculation time.

Such saving may make it economical to operate a printer with a somewhat greater number of recently impaired nozzles. This in turn can significantly extend the lives of the printheads.

It will be noted that the upper portion of the tabulation just presented represents only 10/600 or 1.7% of the full nozzle complement in a 600-nozzle printhead. The possibility of continuing use with a greater fraction, e.g. 10%, of the printhead impaired—i.e., sixty nozzles—offers significant calculation economy.

This analysis was carried out by analogy with a classic problem in a well-known card game. That is the problem of calculating the odds of being dealt a so-called "pat hand" in the game of poker, wherein it is necessary to distinguish between precisely one pair, two pairs, three of a kind, and four of a kind. See, for example, Mickey MacDougall, *MacDougall on Dice and Cards*, Coward-McCann (New York, 1944). Here, each of these cases must be treated separately, since the number of "rows" to be recalculated is not the same for all cases.

There is a more direct and simpler method, however, for estimating the expected number of rows that should be recalculated. As explained earlier, the nozzles (whether or not recently changed in characteristics) are in effect grouped into "teams" that share responsibility for printing particular rows in common.

For instance, in the sixteen-nozzle example above, the nozzles in the team {1, 5, 9, 13} print on the same rows of the paper and are controlled by the same rows of the print mask—namely, rows 1, 5, 9, and 13.

The number of these teams is Q, where this previously introduced fundamental quantity $$Q = N/p$$

is now seen to have yet another physical significance. The sets operate independently. Within a team, however, the nozzles can substitute for one another in the printing task.

If one or more nozzles in a team have failed, the mask rows corresponding to that team should be recalculated. That amounts to p rows—one for each pass.

Accordingly, the total number of rows R to be recalculated is given by $$R = t \cdot p,$$

where t is the number of teams that have suffered the loss of at least one nozzle. We can estimate t on an a priori basis as follows.

The probability that any individual nozzle is impaired can be estimated as I/N, the number of impaired nozzles divided by the total number of nozzles. Conversely, the probability that an individual nozzle has survived is given by (1−I/N).

Now, for a team of nozzles to survive unscathed requires that all of the team members must survive. That probability is given by:

$$H = (1 - I/N)^p,$$

since there are p nozzles in the team.

Conversely, the probability that a team has suffered at least one loss is:

$$1 - H = 1 - (1 - I/N)^p.$$

Since there are Q teams, the predicted number of affected teams is:

$$t = (1 - H)Q,$$

the predicted number of rows to be recalculated is:

$$R = tp$$
$$= (1 - H)Qp$$
$$= (1 - H)N$$
$$= [1 - (1 - I/N)^p]N.$$

This result is to be compared with the earlier and simpler prediction, $R_0 = I \cdot p$, which as will be recalled ignores all possibility of duplication within teams.

For instance, if N=600 and p=4, as in the previous example, the two predictions are:

| I | $R_0$ | R |
|---|---|---|
| 2 | 8 | 7.96 |
| 10 | 40 | 39.01 |

-continued

| I | $R_0$ | R |
|---|---|---|
| 30 | 120 | 111.30 |
| 60 | 240 | 206.34. |

This comparison highlights the importance of the present invention, particularly when the system does not pause very frequently to check nozzle integrity. When the number of nozzles with newly revised weights is thirty (only five percent of the total nozzle complement of N=600), the number of rows R=112 to be recalculated is eight less than the nominal $R_0$=120.

This represents a beneficial reduction in calculation time of 8/120 or about seven percent. With increase to sixty newly questionable nozzles (still only ten percent of all the nozzles), as seen in the tabulation above, the calculation-time saving rises to 33/240 or fourteen percent.

4. Other Features Available in Conventional Shakes

The present invention is applicable generally to all features of conventional Shakes. For example, conventional Shakes enables the generation of a new mask using a flat mask as a reference while building the new mask. Conventional Shakes is also able to handle other types of masks, such as composite masks, halftone masks, and dither masks. Randomization features, inheritance of classes and subclasses, nozzle weighting features, and other Shakes features may also be used by the present invention, with some modifications.

Generally, so long as the incremental nozzle status changes may be noted by the improved Shakes program and the appropriate mask basis used, the present invention may be utilized to generate new masks both quickly and efficiently.

The above disclosure is intended as merely exemplary, and not intended to limit the scope of the invention—which is to be determined by reference to the appended claims.

What is claimed is:

1. A printmasking method for use in a printing device that has multiple printing elements; said method comprising the steps of:
   monitoring condition of the elements;
   then, substantially exclusively for pixel rows corresponding to printing elements whose monitored condition is changed, generating substantially new printmask rows that substantially fully satisfy pixel-grid neighborhood constraints; and
   thereafter using the new rows in printing.

2. The method of claim 1, wherein:
   the generating step comprises operating a program based on substantially fully satisfying pixel-grid neighborhood constraints, to automatically generate substantially the new printmask rows substantially independently of corresponding rows in any earlier printmask, and also without resort to a preestablished matrix of backup or alternate entries.

3. The method of claim 1, further comprising the steps of:
   before the monitoring step, establishing a complete printmask that satisfies pixel-grid neighborhood constraints, considering initial condition of the elements;
   after the establishing step, using the complete printmask in printing; and
   after the generating step, substituting the new rows for corresponding initial rows in the complete printmask.

4. The method of claim 3, wherein:
   with respect to the complete printmask, the neighborhood constraints are defined in terms of printing-element usage weights.

5. The method of claim 3, wherein:
   the monitoring step comprises storing in a computer medium at least a partial historical record of incremental change between initial condition and degraded condition for each printing element.

6. The method of claim 3, wherein:
   the establishing step comprises establishing the complete printmask, and also the printmask with its substituted new rows, as a plural-pass printmask.

7. The method of claim 3, wherein:
   the complete printmask is generated by a Shakes program without resort to a preestablished matrix of backup or alternate entries.

8. The method of claim 1, wherein:
   the generating step comprises automatically generating a number R of rows approximately equal to or less than the product $R_0$ of the number I of changed nozzles and a number p of passes in a printmode that is in use; or equivalently
   in symbols $R \leq R_0$, where $R_0 = I \cdot p$.

9. The method of claim 8, wherein:
   if the number I of changed nozzles is between five and ten percent of the total number of nozzles, then said number R of generated rows is less than said product $R_0$ by a fraction between seven and fourteen percent; or in symbols $0.07 R_0 < (R_0 - R) < 0.14 R_0$.

10. The method of claim 1, further comprising the step of:
    storing, in a computer medium, the new printmask rows.

11. The method of claim 1, further comprising the step of:
    defining the neighborhood constraints in terms of printing-element usage weights; said weights also reflecting the condition of each printing element respectively.

12. The method of claim 1, wherein:
    the monitoring step comprises storing in a computer medium the condition of the elements.

13. A printmasking method for use in a printing device that has multiple printing elements; said method comprising the steps of:
    operating a program based on substantially fully satisfying pixel-grid neighborhood constraints, and on initial condition of the elements, to automatically establish a complete initial printmask;
    then using the complete printmask in printing;
    monitoring condition of the elements;
    then operating a program based on substantially fully satisfying pixel-grid neighborhood constraints, to automatically generate substantially entire new printmask rows, substantially exclusively for rows corresponding to printing elements whose monitored condition is changed;
    then substituting the new rows for corresponding initial rows in the complete initial printmask; and
    thereafter using the printmask with the substituted new rows in printing.

14. The method of claim 13, wherein:
    the generating step uses no preestablished matrix of backup or alternate entries.

15. The method of claim 13, further comprising the step of:
    defining the initial or monitored printing-element condition, or both, by printing-element usage weights that indicate the usage frequency of substantially each printing element within the printmask.

16. The method of claim 13, wherein:

the new rows comprise a number R of rows approximately equal to or less than the product $R_0$ of the number I of changed nozzles and a number p of passes in a print-mode that is in use; or in symbols $R \leq R_0$, where $R_0 = I \cdot p$.

17. The method of claim 16, wherein:

said number R of new rows is on average approximately $R = [1-(1-I/N)^p]N$, where N=the total number of nozzles.

18. An incremental printing device for use with at least one printmask; said printing device comprising:

multiple printing elements;

means for automatically generating an initial printmask;

means for applying the mask to print an image; and means, responsive to progressive condition of the respective elements, for revising the printmask by generating exclusively new printmask rows associated with a printing element whose condition is changed;

wherein the program operates substantially independently of initial printmask rows corresponding to the new rows, and without resort to a preestablished matrix of backup or alternate entries.

19. The incremental printing device of claim 18, wherein:

the revising means comprise means for automatically generating a number R of rows approximately equal to or less than the product $R_0$ of the number I of changed nozzles and a number p of passes in a printmode that is in use; or in symbols $R \leq R_0$, where $R_0 = I \cdot p$.

20. The incremental printing device of claim 19, wherein:

if the number I of changed nozzles is between five and ten percent of the total number of nozzles, then said number R of generated rows is less than said product $R_0$ by a fraction between seven and fourteen percent; or in symbols $0.07 R_0 < (R_0 - R) < 0.14 R_0$.

21. The incremental printing device of claim 18, wherein:

the revising means comprise means for automatically generating a number of rows approximately equal to or less than the number of deteriorated nozzles multiplied by a number of passes in a printmode that is in use.

22. The incremental printing device of claim 18, wherein:

the preestablished program is in software, firmware, or hardware, or a combination thereof.

23. The incremental printing device of claim 18, wherein:

the generating means are in software, firmware, hardware, or a combination thereof.

* * * * *

UNITED STATES PATENT AND TRADEMARK OFFICE
CERTIFICATE OF CORRECTION

PATENT NO. : 7,207,640 B2
APPLICATION NO. : 10/994766
DATED : April 24, 2007
INVENTOR(S) : Santiago Garcia Reyero et al.

It is certified that error appears in the above-identified patent and that said Letters Patent is hereby corrected as shown below:

In column 1, line 16, delete "6,826,109" and insert -- 6,862,109 --, therefor.

In column 28, line 38, after "are" delete "is".

In column 29, line 53, delete "N nozzles" and insert -- N=nozzles --, therefor.

In column 29, line 54, delete "p number" and insert -- p=number --, therefor.

In column 41, line 5, in Claim 16, delete "print-mode" and insert -- printmode --, therefor.

Signed and Sealed this

Seventh Day of October, 2008

JON W. DUDAS
*Director of the United States Patent and Trademark Office*